United States Patent
Kamon

(10) Patent No.: US 7,598,994 B2
(45) Date of Patent: Oct. 6, 2009

(54) IMAGE PICKUP APPARATUS AND IMAGE PICKUP METHOD

(75) Inventor: Koichi Kamon, Otokuni-gun (JP)

(73) Assignee: Konica Minolta Holdings, Inc., Tokyo (JP)

( * ) Notice: Subject to any disclaimer, the term of this patent is extended or adjusted under 35 U.S.C. 154(b) by 444 days.

(21) Appl. No.: 11/524,072

(22) Filed: Sep. 20, 2006

(65) Prior Publication Data

US 2007/0076106 A1    Apr. 5, 2007

(30) Foreign Application Priority Data

Oct. 4, 2005    (JP)    ............................. 2005-290821

(51) Int. Cl.
*H04N 5/335*    (2006.01)

(52) U.S. Cl. ...................... 348/302; 348/304; 348/306; 348/241; 348/250; 348/294; 250/208.1

(58) Field of Classification Search ................. 348/302, 348/304, 398, 294, 241, 306, 250; 250/208.1
See application file for complete search history.

(56) References Cited

U.S. PATENT DOCUMENTS

| | | | |
|---|---|---|---|
| 6,191,408 B1 | 2/2001 | Shinotsuka et al. | 250/208.1 |
| 7,106,373 B1 * | 9/2006 | Dierickx | 348/308 |
| 2005/0012838 A1 * | 1/2005 | Kusuda | 348/308 |
| 2005/0046721 A1 * | 3/2005 | Harada | 348/311 |
| 2005/0062085 A1 * | 3/2005 | He et al. | 257/292 |
| 2005/0117042 A1 * | 6/2005 | Hirotsu et al. | 348/308 |
| 2005/0121519 A1 * | 6/2005 | Shinohara | 235/454 |
| 2005/0225653 A1 * | 10/2005 | Masuyama et al. | 348/241 |

FOREIGN PATENT DOCUMENTS

| | | |
|---|---|---|
| JP | 11-298799 A | 10/1999 |
| JP | 2000-175108 A | 6/2000 |

* cited by examiner

*Primary Examiner*—David L Ometz
*Assistant Examiner*—Quang V Le
(74) *Attorney, Agent, or Firm*—Sidley Austin LLP

(57) ABSTRACT

In an image pickup apparatus including an image pickup device configured by a plurality of pixels having different photoelectric conversion characteristics on each side of the inflection point of the photoelectric conversion characteristic, prior to the image picking-up for recording, resetting the image pickup device twice by using different voltages with the image pickup device being light shielded, generating inflection point data showing an infection point by using imaged data obtained after reset operation, and afterward correcting the inflection points variation by using the inflection point data can correct the variation of the photoelectric conversion characteristic in a substantially real time. And it can provide a less expensive and high image quality image pickup apparatus and a method for taking a high quality image.

18 Claims, 16 Drawing Sheets

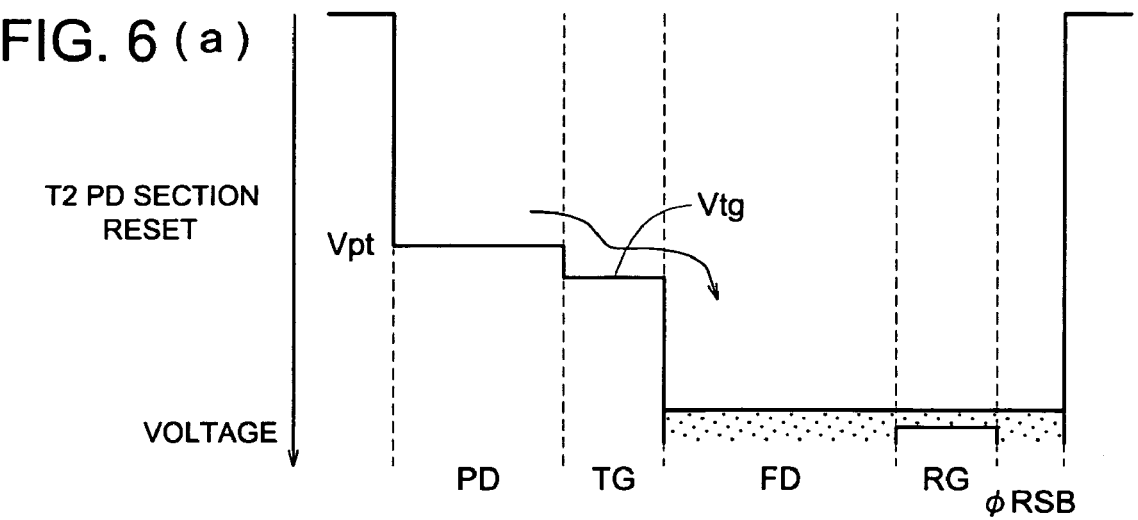
FIG. 6(a) T2 PD SECTION RESET
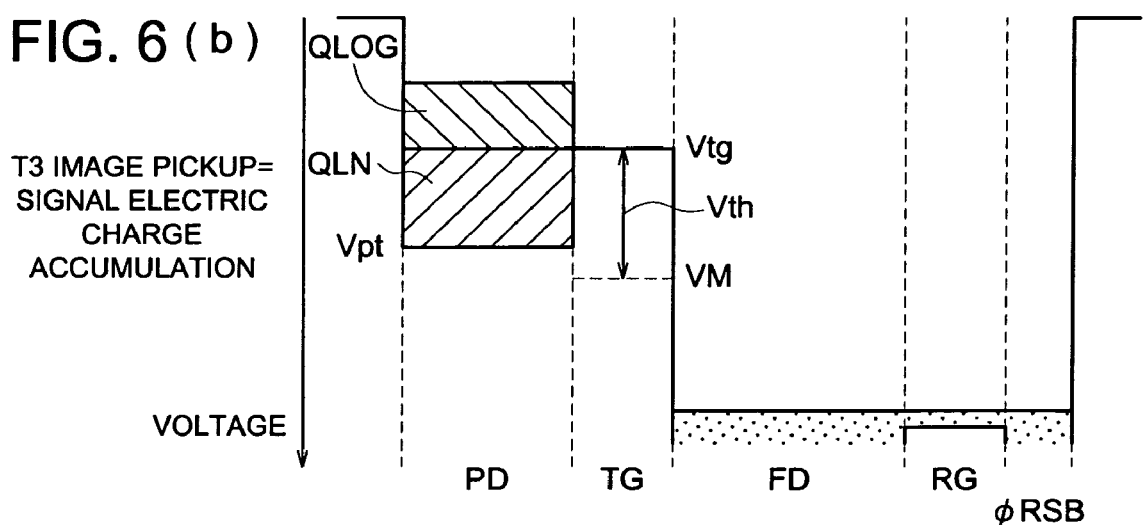
FIG. 6(b) T3 IMAGE PICKUP= SIGNAL ELECTRIC CHARGE ACCUMULATION
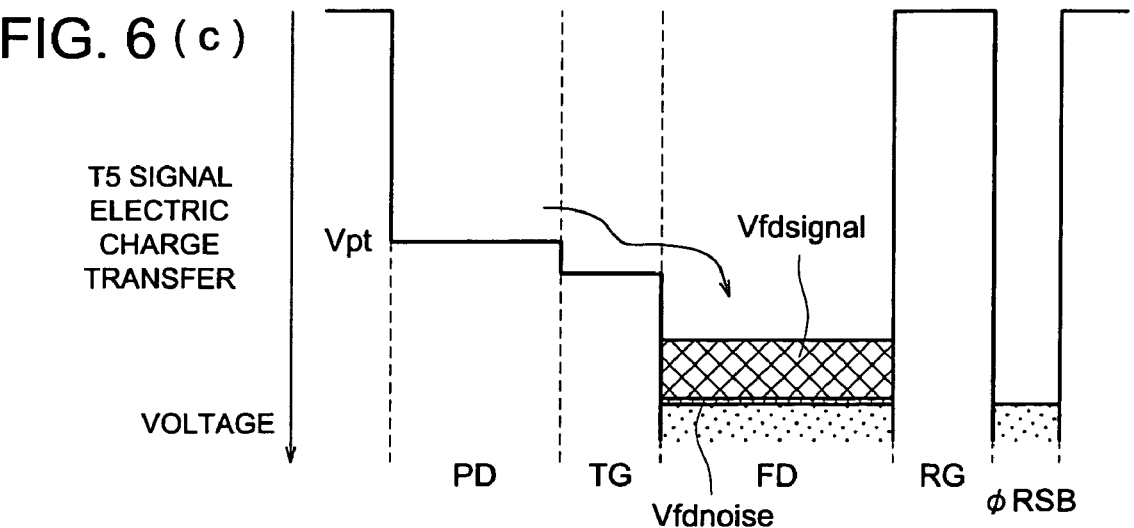
FIG. 6(c) T5 SIGNAL ELECTRIC CHARGE TRANSFER

T11 PD SECTION L RESET

T12 PD SECTION H RESET

T13 PD ELECTRIC CHARGE TRANSFER

IMAGE PICKUP APPARATUS AND IMAGE PICKUP METHOD

This application is based on Japanese Patent Application No. 2005-290821 filed on Oct. 4, 2005, in Japanese Patent Office, the entire content of which is hereby incorporated by reference.

TECHNICAL FIELD

The present invention relates to an image pickup apparatus, particularly to an image pickup apparatus including an image pickup device configured of a plurality of pixels having different photoelectric conversion characteristics on each side of an inflection point of the photoelectric conversion characteristic and relates to an image pickup method for correcting the deviation of the photoelectric conversion characteristics of the image pickup device configured with a plurality of pixels from a standard photoelectric conversion characteristic.

BACKGROUND

In a prior art, for example, in an image pickup apparatus having an image pickup device (which is called a linear-logarithmic sensor) having a linear photoelectric conversion characteristic in a low illuminance side and a logarithmic photoelectric conversion characteristic in a high illuminance side, (which is called a linear-logarithmic characteristic), there was a case that the inflection points vary in response to the characteristic variation of an element configuring the pixel of the image pickup device. And it has given more than a few bad influences on image quality.

Thus, with respect to a correction method for correcting the variation of the inflection point, a method for converting image data of all pixels obtained when the image was picked up to the data on a standard photoelectric conversion characteristic has been proposed in Japanese Patent Application Open to Public Inspection No. H11-298799. Further, Japanese Patent Application Open to Public Inspection No. H11-298799 discloses a method for memorizing the ratio between the temperature coefficients of all the pixels against the ambient temperature and the standard temperature coefficient, and a method for correcting the temperature characteristic based on the ambient temperature detected by a temperature sensor.

Japanese Patent Application Open to Public Inspection No. 2000-175108 discloses a method for correcting a signal in a linear characteristic area after correcting a signal offset in a logarithmic area so as to have an arbitrary offset and detecting the temperature of an image pickup device to conduct temperature correction.

However, according to the method disclosed in Japanese Patent Application Open to Public Inspection No. H11-298799, in order to divide the photoelectric conversion characteristics of all the image pickup device of two million pixels used in a less expensive digital camera into 1,000 (one thousand) illuminance, each area of which has a 16 bit (two bytes) data form, and to memorize the data, 4 G Byte memory, which is derived by a formula; 2 million×1,000×2, which is more than a huge memory installed in a personal computer is required. Thus, this method will not be applied to an image pickup apparatus such as a digital camera. Further, in order to compare the imaged data of all the pixels to the memorized photoelectric conversion characteristics to correct the imaged data onto the data on the standard photoelectric conversion characteristic based on the result, huge number of calculations and operation time to perform the calculations are required. Thus, this method will not be realistic to be applied to an image pickup apparatus such as a digital camera.

Further, according to the method disclosed in Japanese Patent Application Open to Public Inspection No. 2000-175108, as shown in FIG. 16(a), when considering a photoelectric conversion characteristic 601 (hereinafter, referred to as standard characteristic), which is a linear logarithmic characteristic and a standard photoelectric conversion characteristic for all the pixels and a photoelectric conversion characteristic having a shifted inflection point against the standard characteristic (hereinafter, referred to as comparative characteristic), if trying to match the comparative characteristic 603 (having a linear characteristic 601a and a logarithmic characteristic 603c in each side of a inflection point 603d) to a standard characteristic 601 (having a linear characteristic 601a and a logarithmic characteristic 601c across a inflection point 601d) by conducting a parallel shift (hereinafter, referred to as an offset) 605 in the vertical direction of the drawing, a portion, in the logarithmic characteristic 603c, where an image pickup surface illuminance is higher than Lm coincides to the logarithmic characteristic 601c. However a portion 603b, in the logarithmic characteristic 603c, where the image pickup surface illuminance is lower than Lm becomes a logarithmic characteristic 607 band does not coincide to a portion 601b, in a linear characteristic 601a, where the image pickup surface illuminance of the portion 601a is higher than Ln. Namely, inflection point variation cannot be corrected.

Here, FIG. 16(a) illustrates a schematic diagram for showing a graph of two photoelectric conversion characteristics 601 and 603 including a linear-logarithmic characteristic having inflection variation (inflection points 601d and 603d). FIG. 16(a) has a horizontal axis, which is a logarithmic axis of an image pickup surface illuminance L and a vertical axis, which is a linear axis of a photoelectric conversion output VP. The image pickup surface illuminance of the inflection point 601d is Lm and the photoelectric conversion output is Vm. The image pickup surface illuminance of the inflection point 603d is Ln and the photoelectric conversion output is Vn.

As illustrated in FIG. 16(b), the inflection point drifts in response to the temperature. According to the measurement results of an inventor of the present invention, as illustrated in FIG. 16(b), under the condition of a practical temperature range from 0° C. to 65° C., characteristic in the linear characteristic area has little changes due to the temperature change. However, in the logarithmic characteristic area, the inflection point shifts toward the lower illuminance side and the slope of the characteristic becomes steeper as the temperature rises. The reason why the slope of the characteristic becomes steeper is that the logarithmic characteristic is characteristic, which proportions to the absolute temperature.

Japanese Patent Application Open to Public Inspection No. H11-298799 discloses a method for memorizing the ratio between the temperature coefficients of all pixels against ambient temperature and the standard temperature coefficient, and correcting the temperature characteristic based on the ambient temperature detected by a temperature sensor. However, the ambient temperature detected by the temperature sensor is not always real temperature of an image pickup device. Thus the temperature cannot be correctively corrected by the method disclosed in Japanese Patent Application Open to Public Inspection No. H11-298799.

Japanese Patent Application Open to Public Inspection No. 2000-175108 also discloses a method for detecting the temperature of an image pickup device by a temperature sensor and conducting temperature correction. However, there is no explanation about the temperature sensor. Accordingly, it cannot be said that temperature measurement of the image pickup device can be conducted.

SUMMARY

It is therefore an object of the present invention to provide an image pickup apparatus, which can contribute to improve the image quality of a photographed image by correcting the variation of the photoelectric conversion characteristic of the image pickup device in a real time and to provide a method for image pickup.

In view of forgoing, one embodiment according to one aspect of the present invention is an image pickup apparatus, comprising:

an image pickup device including a plurality of pixels which have a plurality of different photoelectric conversion characteristics different from each other on each side of an inflection point;

a light shielding member for shading the pixels;

an image pickup control section for controlling an image pickup operation of the image pickup device, the image pickup control section having a reset mode in which the image pickup control section resets the pixels of the image pickup device to predetermined first and second potentials different from each other with the pixels of the image pickup device shaded by the light shielding member and thereafter outputs imaged data; and an image processing section for image processing the imaged data outputted from the image pickup device, wherein the image processing section, including:

an inflection point data generation section for generating an inflection point data which indicates inflection points of the photoelectric conversion characteristics of the pixels of the image pickup device based on the imaged data outputted in the reset mode; and an inflection point correction section for executing a correction operation for correcting differences between an inflection point of a standard photoelectric conversion characteristic and the inflection points of the photoelectric conversion characteristics of the pixels of the image pickup device based on the inflection point data.

According to another aspect of the present invention, another embodiment is an image pickup apparatus, comprising:

an image pickup device including a plurality of pixels which have a plurality of different photoelectric conversion characteristics different from each other on each side of an inflection point;

an image pickup control section for controlling an image pickup operation of the image pickup device, the image pickup control section having a reset mode in which the image pickup control section resets the pixels of the image pickup device to predetermined first and second potentials different from each other and thereafter outputs imaged data; and an inflection point correction section for generating an inflection point data which indicates inflection points of the photoelectric conversion characteristics of the pixels of the image pickup device based on the imaged data outputted in the reset mode and executing a correction operation for correcting a differences between an inflection point of a standard photoelectric conversion characteristic and the inflection points of the photoelectric conversion characteristics of the pixels of the image pickup device based on the inflection point data.

According to another aspect of the present invention, another embodiment is a method for image pickup using an image pickup device including a plurality of pixels which have a plurality of different photoelectric conversion characteristics different from each other on each side of an inflection point, the method comprising the steps of:

executing a reset mode in which the pixels of the image pickup device are reset to predetermined first and second potentials different from each other with the pixels of the image pickup device shaded and thereafter outputting imaged data;

generating inflection point data based on the imaged data outputted in the reset mode, the inflection point data indicating the inflection point of the photoelectric conversion characteristic of the pixel of the image pickup device; and correcting an error between an inflection point of a standard photoelectric conversion characteristic and the inflection point of the photoelectric conversion characteristics of the pixels of the image pickup device on the inflection point data.

BRIEF DESCRIPTION OF THE DRAWING

FIG. 6(a) illustrates a schematic drawing showing a potential of each portion of a pixel at the timing T2 as illustrated in FIG. 5(a).

FIG. 6(b) illustrates a schematic drawing showing a potential of each portion of a pixel at the timing T3 as illustrated in FIG. 5(a).

FIG. 6(c) illustrates a schematic drawing showing a potential of each portion of a pixel at the timing T5 as illustrated in FIG. 5(b).

DETAILED DESCRIPTION OF THE PREFERRED EMBODIMENT

An embodiment of the present invention will be described below by using drawings.

At first, a digital camera, which is an example of an image pickup apparatus of the present invention, will be described by using FIG. 1(a), FIG. 1(b) and FIG. 2.

Figure 1A:
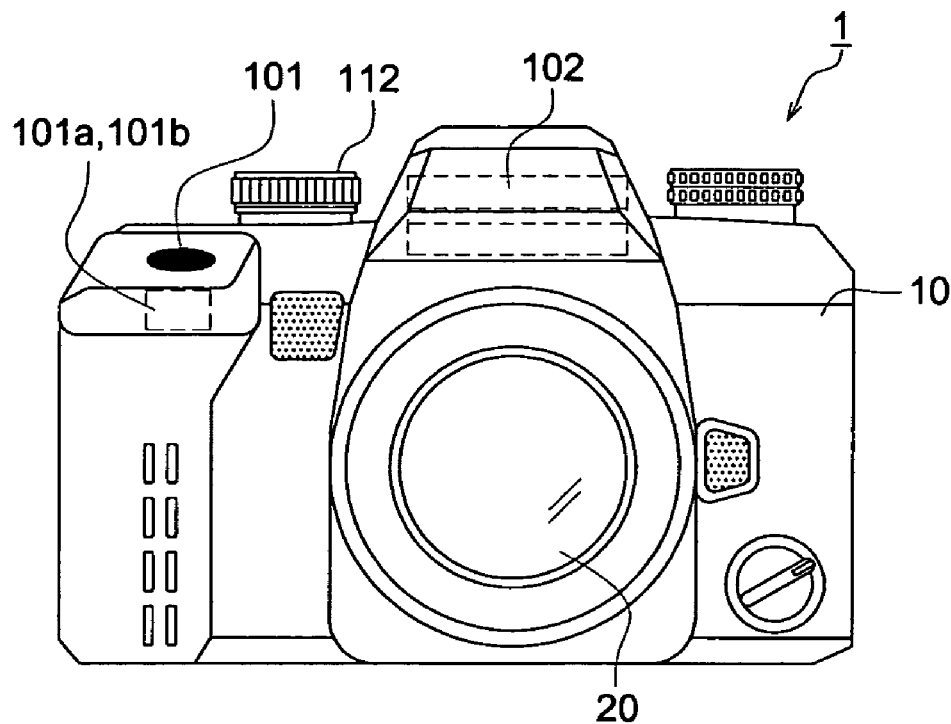
FIGS. 1(a) and 1(b) illustrate an external schematic drawing of a digital camera, which is an example of an image pickup apparatus of the present invention.
Figure 1B:
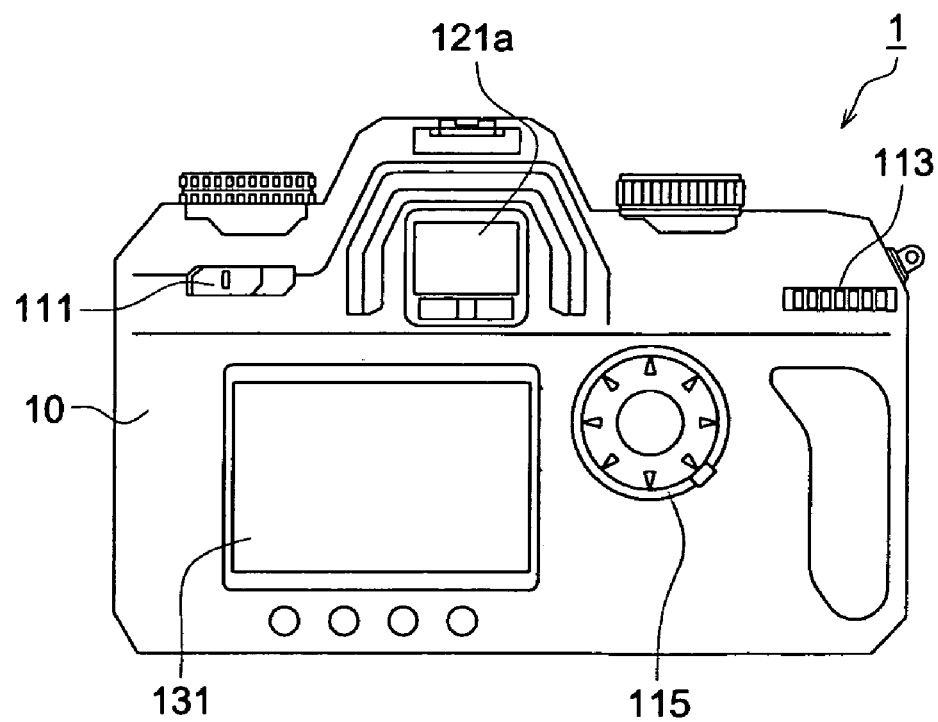

FIG. 1(a) is a front view of a schematic drawing of an external appearance of a digital camera and FIG. 1(b) is a rear view of a schematic drawing of the external appearance of the digital camera.

In FIG. 1(a), an interchangeable lens 20 is attached onto a front side of a body 10 of a digital camera 1. A release button 101, which is an operational member for image picking-up, is provided on an upper surface of the body 10. In a portion which is inside of the body 10 and under the release button 101, is provided a two step switch, which configures an AF switch 101a for operating at the first pressing operation of the release button 101 and a release switch 101b for operating at the second pressing operation of the release button 101, is provided. Further, at the upper portion of the body 10, a flash 102 is installed and a mode setting dial 112 for setting operation modes of the digital camera 1 is provided.

As illustrated in FIG. 1(b), on the rear surface of the body 10, are provided a change dial 113 for changing various camera setting conditions, a jog dial 115, which is configured with total five switches disposed at the upper portion, the lower portion, the left and right portions and the central portion of the jog dial 115, for setting various settings of the various setting modes of the digital camera 1, a finder eyepiece 121a and an image display section 131 for displaying a recorded image and various information.

Figure 2:
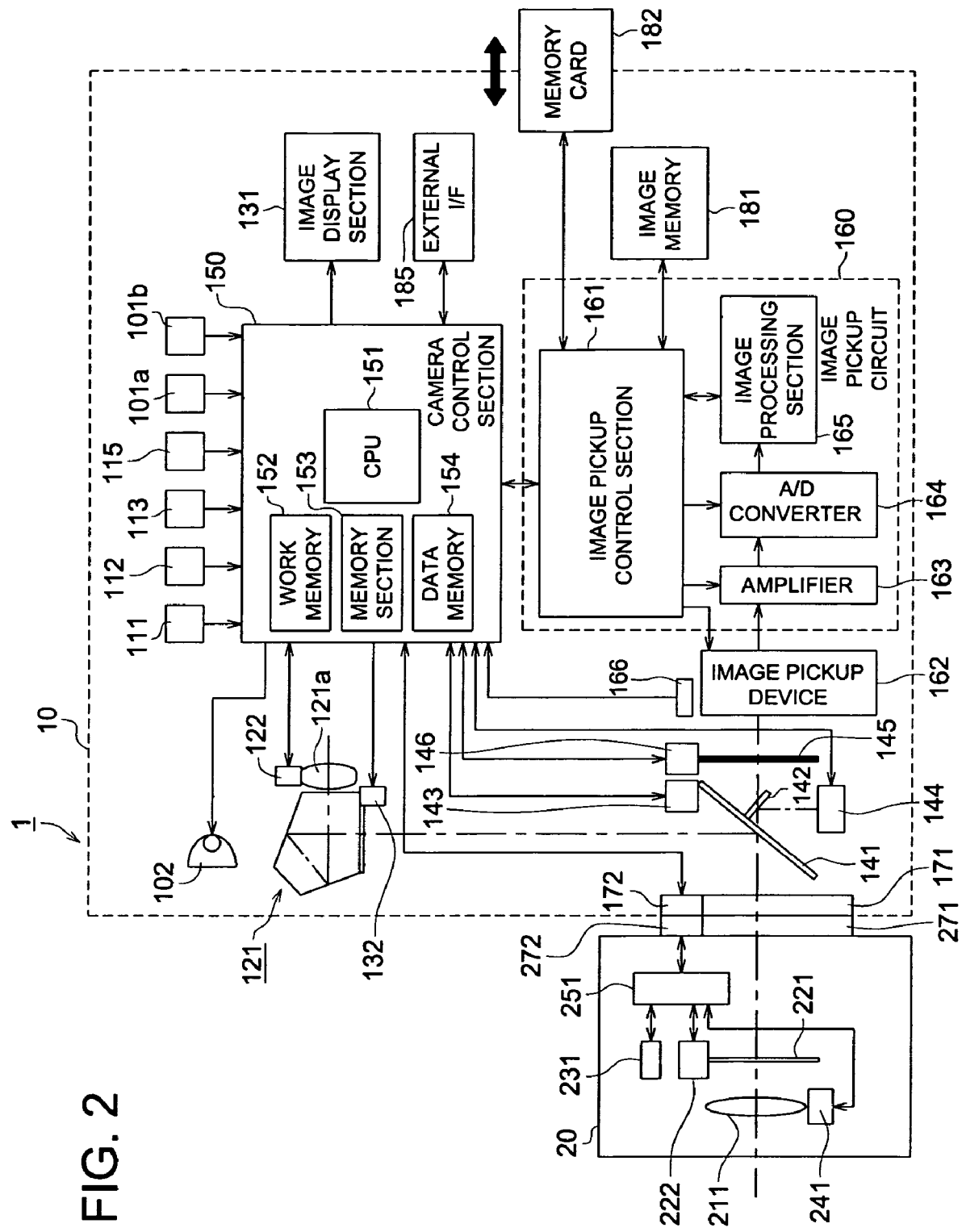
FIG. 2 illustrates a block diagram showing an example of a circuit for the digital camera illustrated in FIGS. 1(a) and 1(b).

FIG. 2 illustrates a block diagram showing an example of circuit for a digital camera illustrated in FIGS. 1(a) and 1(b). In FIG. 2, the same number is given to the same portion of FIGS. 1(a) and 1(b).

A camera control section 150 of the digital camera 1 is configured with a CPU (Central Processing Circuit) 151, a work memory 152, a memory section 153 and a data memory 154. A program, which is stored in the memory section 153 is read out and stored in the work memory 152. Then each portion of the digital camera 1 is centrally controlled according to the program. The data memory 154 functions as an inflection point correction memory in the present invention.

A camera control section 150 receives signals from a power switch 111, a mode setting dial 112, a change dial 113, a jog dial 115, an AF switch 101a and a release switch 10b. The camera control section 150 controls a photometry operation by communicating with a photometry module 122 on an optical finder 121 and drives a reflex mirror 141 and a sub-mirror 142 through a mirror driving section 146. The camera control section 150 also controls a shutter 145 through a shutter driving section 146, a flash 102 and an image pickup operation by communicating with an image pickup control section 161. Further, the camera control section 150 displays a photographed image and various kinds of information onto an image display section 131 and the various kinds of information on an in-finder display 132. A shutter 145 works as a light shielding member in the present invention.

The camera control section 150 transmits or receives a photographed image data and a control signal of the digital camera 1 to or from a personal computer and a cellular phone provided external of the digital camera 1 through an external interface (I/F) 185.

Further, the camera control section 150 totally controls an interchangeable lens 20 through a BL communication section 172 (a body side) provided on a mount 171 (a body side) and a BL communication section 272 (a lens side) provided on a mount 271 (a lens side), which conduct communication between the body 10 and the interchangeable lens 20 by communicating with a lens control section 241 for controlling focusing and zooming of a lens 211, a aperture control section 222 for conducting control of an aperture 221 and a lens information memory 231 for storing inherent information of the changeable lens 20 through a lens interface 251 of the interchangeable lens 20.

An optical image focused by the lens 211 of the interchangeable lens 20 is converted into electric signals by an image pickup device 162 and amplified by an amplifier 163. Then the electric signals are converted into digital data by an analog/digital (A/D) converter 164. The digital data is converted into digital imaged data by an image processing section 165, by which a predetermined image processing is applied to the digital data, and finally recorded into a memory card 182 after temporally recorded into an image memory 181. The image pickup control section 161 controls these operations under the control of the camera control section 150. The image pickup control section 161, the amplifier 163, the A/D converter 164 and the image processing section 165 configure an image pickup circuit 160.

A temperature sensor 166 is disposed adjacent to the image pickup device 162. The temperature sensor 166 and the camera control section 150 detect the temperature of the image pickup device 162 or the temperature inside the digital camera 1.

Next, an embodiment of an image pickup device of the present invention and its normal image pickup operation will be described below by using FIGS. 3-6.

Figure 3:
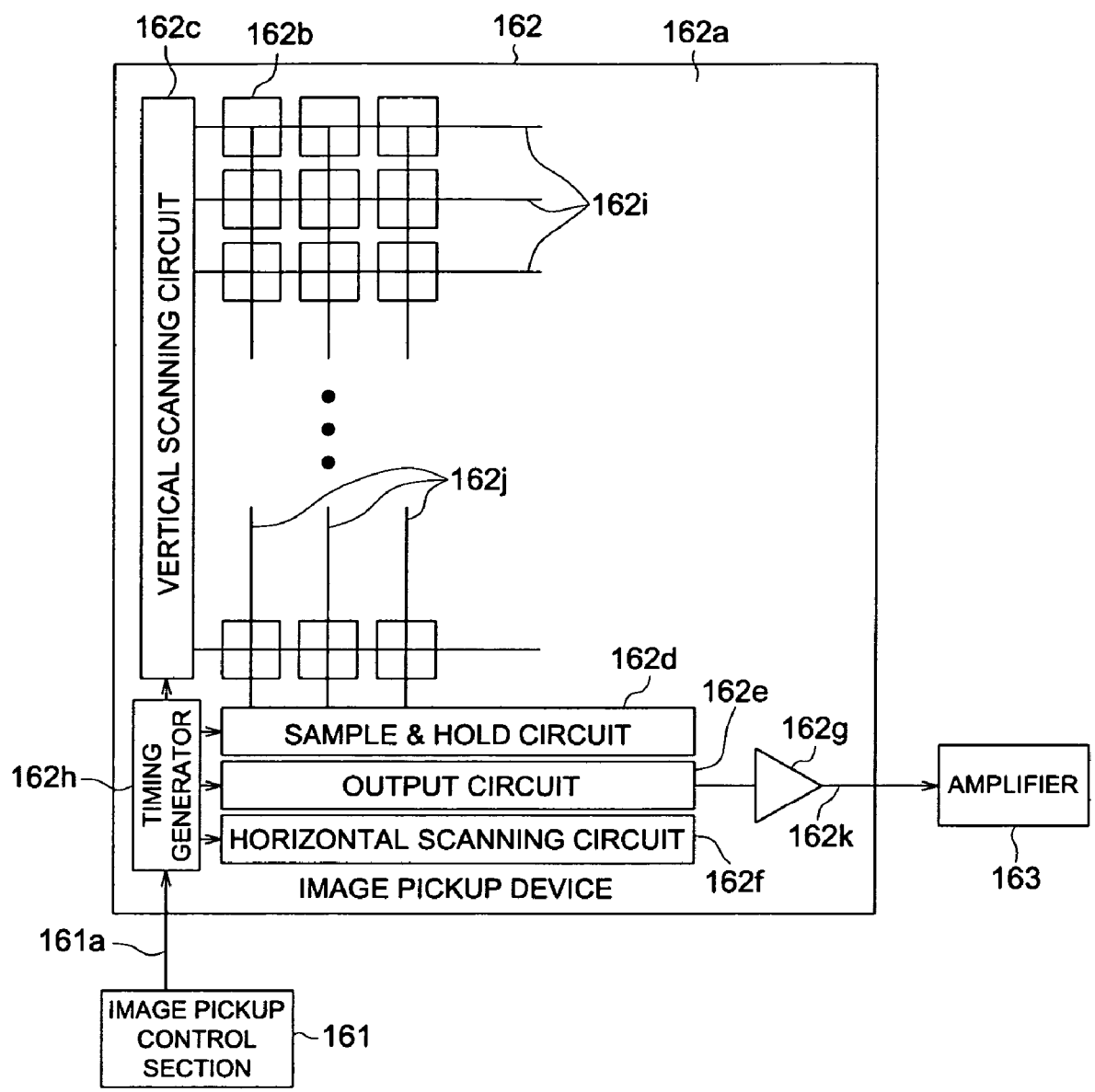
FIG. 3 illustrates a schematic diagram showing an example of an arrangement of each element configuring an image pickup device.

FIG. 3 illustrates a schematic diagram showing an example of arrangement of each element configuring the image pickup device 162.

The image pickup device 162 includes components such as multiple pixels 162b, which are horizontally and vertically disposed, a vertical scanning circuit 162c, a sample & hold circuit 162d, an output circuit 162e, an output amplifier 162g, a horizontal scanning circuit 162f and a timing generator 162h on an image pickup surface 162a. Each horizontal row of the pixel 162 and the vertical scanning circuit 162c are connected by a row selecting line 162i and each vertical column of the pixel 162b and the sample & hold circuit 162d are connected by a vertical signal line 162j.

Here, the sample & hold circuit 162d includes two capacitors (which are not shown) per one vertical signal line 162j. In the driving method of the image pickup device 1, which will be described later in FIGS. 5(a) and 5(b), one of the two capacitors holds noise component of a pixel and the other capacitor holds the (signal+noise) component of the pixel. Then take the difference between these components to remove the noise, which is so called CDS (Correlated Double Sampling).

The image pickup operation of the image pickup device 162 is controlled by the timing generator 162h under the control of the image pickup control signal 161a outputted from the image pickup control section 161. Imaged data 162k, which is an output signal from the image pickup device 162 is inputted to the amplifier 163.

Figure 4:
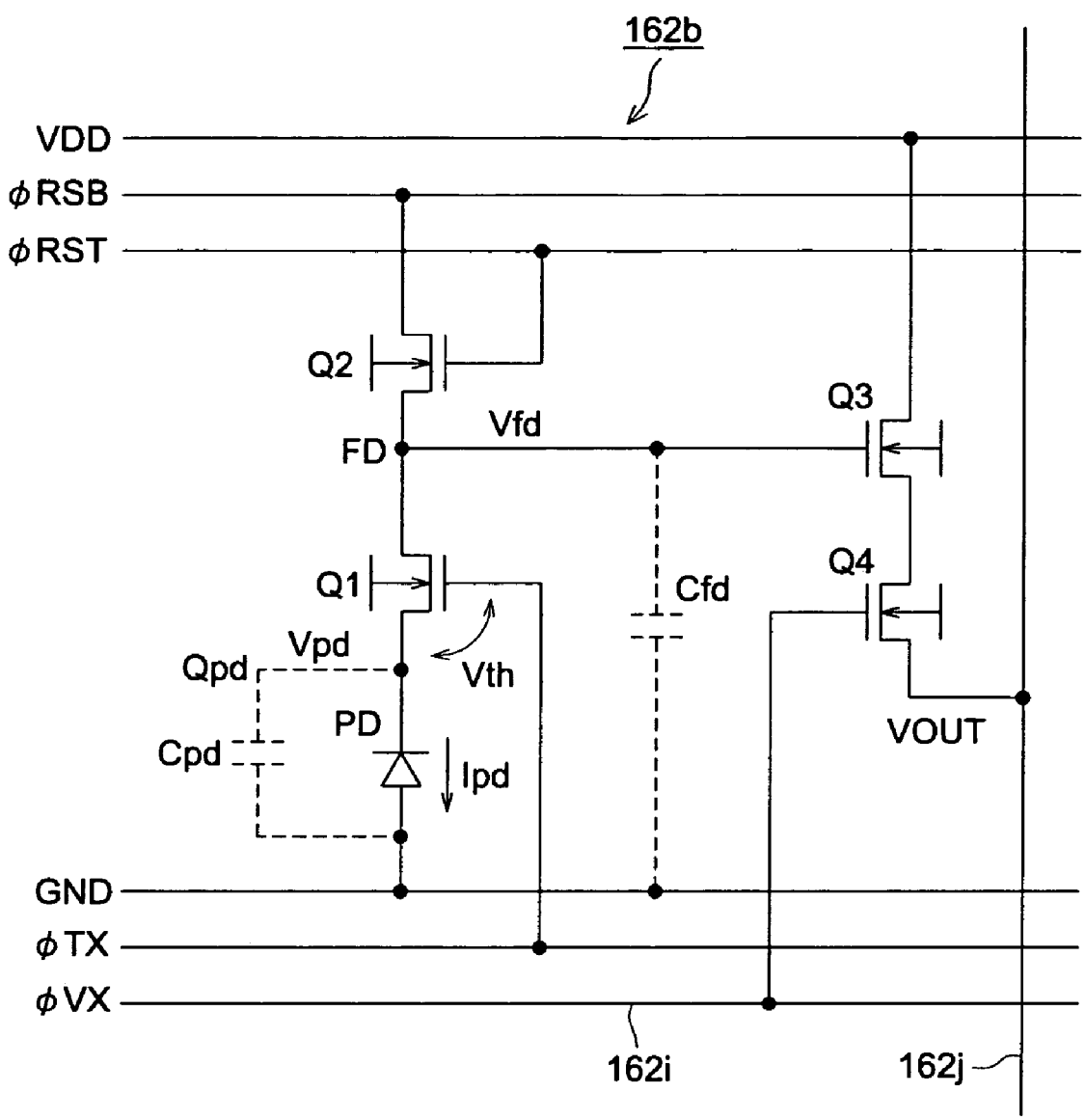
FIG. 4 illustrates an example of a circuit diagram of a pixel configuring the image pickup device.

FIG. 4 illustrates an example of a circuit diagram of a pixel 162b configuring the image pickup device 162.

The pixel 162b comprises a buried photodiode PD (it will be called PD section hereinafter) and N channel MOSFETs (Metal Oxide Semiconductor Field Effect Transistors: they will be called transistors hereinafter) Q1-Q4. The connection between the drain of the transistor Q1 and the source of the transistor Q2 is structured by floating diffusion FD (it will be called FD section hereinafter). Reset voltage φRSB, reset signal φRST, transfer signal φTX and read out signal φRVS denote signals (voltage) to those transistors. Further VDD denotes a power source, and GND denotes ground.

The PD section functions as a photoelectric conversion section in the present invention. The PD section generates photocurrent Ipd corresponding to an incident light amount from a subject. The photocurrent Ipd is stored in a parasitic capacity Cpd of the PD section as a signal electric charge Qpd. The PD section has a buried structure and the photocurrent Ipd, which has been converted from light beam to the electric current, cannot be directly read out. Therefore, the PD section is connected to the FD section through the transistor Q1 (it will be called a transfer gate TG hereinafter), which will function as an electric charge transfer section of the present invention.

When image picking-up, the transfer signal φTX is set at a middle voltage VM. Assuming that the threshold voltage of the transfer gate TG is Vth, the signal electric charge Qpd is stored in the parasitic capacity Cpd of the PD section as it has been until the voltage of the PD section Vpd reaches to (VM−Vth), (it is a linear photoelectric conversion characteristic). When the voltage Vpd exceeds (VM−Vth), current/voltage conversion is conducted based on the sub-threshold characteristic of the transfer gate TG. Thus the signal electric charge Qpd is logarithmically compressed and the compressed charge is stored in the parasitic capacity Cpd (Logarithmic photoelectric conversion characteristic). Accordingly, when the photocurrent Ipd is small, namely, when the subject is dark, the photoelectric conversion characteristic expresses a linear photoelectric conversion characteristic. When the photocurrent Ipd is large, namely, the subject is bright, the photoelectric conversion characteristic becomes a logarithmic photoelectric conversion characteristic.

The threshold value Vth of the transfer gate varies pixel by pixel. Namely, even though the gate voltage of the transfer gate TG of each pixel is uniformly set at the middle voltage VM in the transfer signal φTX, a inflection point, which is a point where the photoelectric conversion characteristic changes from a linear characteristic to a logarithmic characteristic, varies in response to the variation ΔVth of the threshold voltage Vth of each pixel. Further, the threshold voltage Vth has a temperature characteristic. Thus, the variation of the inflection point has a temperature characteristic.

A transistor Q2 is called a reset gate (it will be called a reset gate RG hereinafter). When the transistor Q2 is set to ON, the FD section is reset to a predetermined reset voltage φRSB.

A transistor Q3 configures a source follower amplifier circuit, which plays a role for lowering the output impedance by amplifying current of the voltage Vfd of the FD section.

A transistor Q4 is a transistor for reading out the signal. The gate of the transistor Q4 is connected to the row selection line 162i and works as a switch, which is set to ON and OFF corresponding to the reading out signal φVX inputted by the vertical scanning circuit 162c. The source of the transistor Q4 is connected to the vertical signal line 162j. When the transistor Q4 is set to ON, the voltage Vfd of the FD section is derived to the vertical signal line 162j with a low output impedance due to the effect of the transistor Q3.

Next, the normal image pickup operation of the image pickup device 162 will be described below by using FIGS. 5(a) and 5(b), and FIGS. 6(a), 6(b) and 6(c).

Figure 5A:
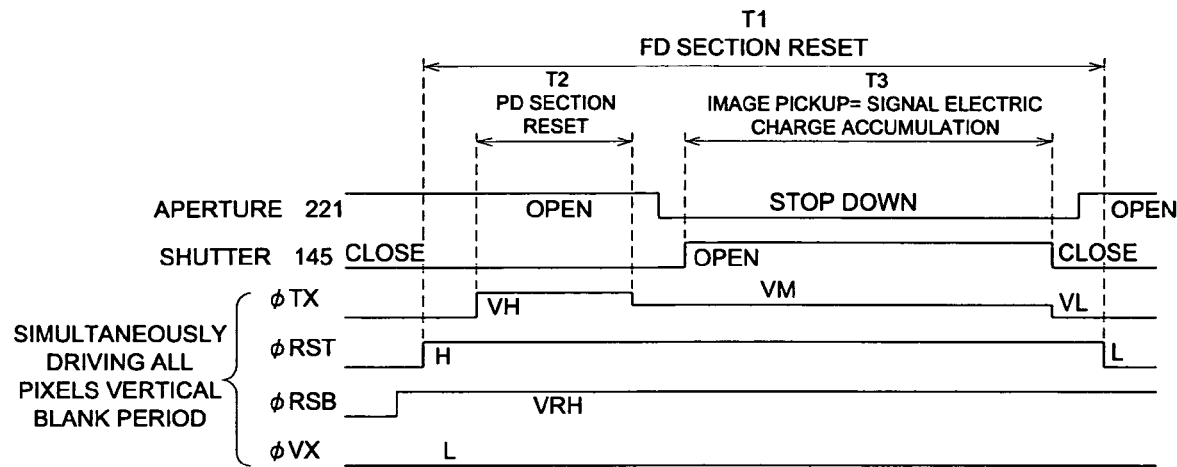
FIGS. 5(a) and 5(b) illustrate a timing chart for driving the image pickup device in a normal image pickup operation.
Figure 5B:
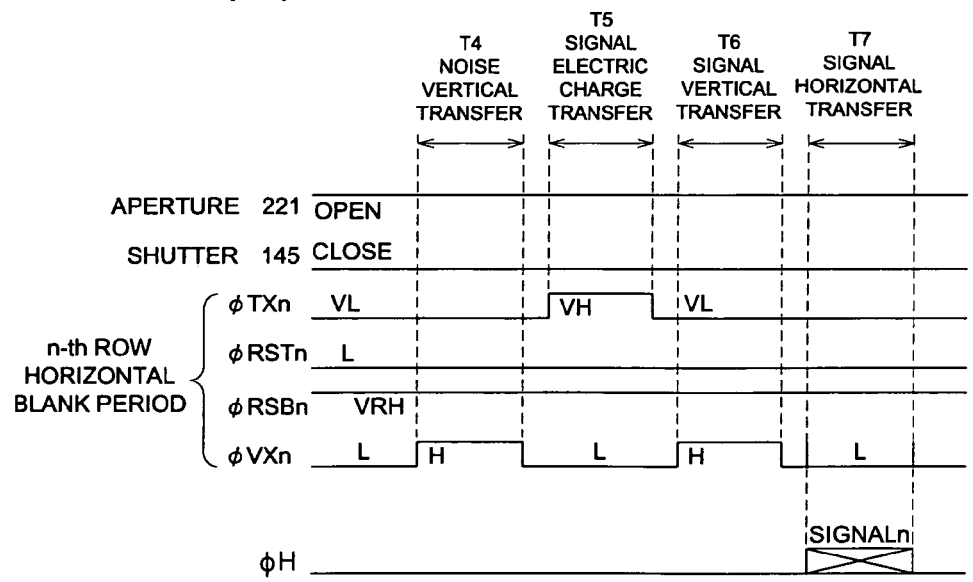

FIGS. 5(a) and 5(b) illustrate a timing chart for showing the drive of the image pickup device 162 at a time of normal image pickup. FIG. 5(a) illustrates a timing chart of the image pickup operations, which are simultaneously conducted by all the pixels in a vertical blank (V-blank) period of the image pickup operation. FIG. 5(b) illustrates a timing chart of the vertical transfer operation and the horizontal transfer operation of noise data and imaged data, which is sequentially conducted in an every horizontal row in a horizontal blank (H-blank) period.

FIGS. 6(a), 6(b) and 6(c) illustrate schematic drawings showing respective potentials (voltages) of the PD section, the transfer gate TG, the reset gate RG and the reset voltage φRSB at the each timing shown in FIGS. 5(a) and 5(b), when looking at a certain pixel. According to the semiconductor reference documents, in general, in a potential drawing, the voltage is higher as the position comes lower on the drawing. Thus, the present specification follows this rule.

In FIG. 5(a), under the condition that the shutter 145 is kept closed, the reset voltage φRSB is set at a high voltage VRH. Thus, setting the reset signal φRSB to the high voltage sets the reset gate RG to an ON state. As a result, the voltage Vfd of the FD section is reset to a predetermined high voltage VRH (initialized). At the timing of T2, setting the transfer signal φTX to the high voltage VH sets the transfer gate TG to an ON state. Thus, electrical charge residing in the parasitic capacity Cpd of the PD section is completely transferred to the FD section. As a result, the parasitic capacity Cpd is reset (initialized). Based on these operations, the PD section is reset together with the FD section (initialized).

FIG. 6(a) illustrates a schematic drawing showing a potential of each portion of a certain pixel at the timing T2. As described above, setting the transfer signal φTX to the high voltage VH sets the transfer gate TG to an ON state. Thus, electrical charge residing in the parasitic capacity Cpd of the PD section is completely transferred to the FD section. As a result, the parasitic capacity Cpd is reset (initialization). At this moment, since the reset gate RG is in an ON state, the electrical charge transferred from the PD section to the FD section is also reset. An impurity density of the PD section and its adjacent portion determines the potential of the PD section, which is a buried type photodiode. Assuming that the potential of the PD section under a depletion state is Vpt, the high voltage VH of the transfer signal φTX is set so that the potential Vtg of the transfer gate TG becomes lower potential than the potential Vpt of the PD section.

Setting the transfer signal φTX to the middle voltage VM at the last portion of the timing T2 allows the PD section to become a state in which photoelectric conversion is possible in the linear logarithmic characteristic. Then, an aperture 221 is stopped down to a certain value according to the AE result. At the beginning of the timing T3, the shutter 145 is opened. The light beams from the subject are converted into electrical signals and a signal electric charge Qpd is stored into the parasitic capacitor Cpd. Then, the operation continues until the shutter 145 is closed at the last portion of the timing T3. The aperture 221 is released to an open state after the shutter 145 is closed.

At the last portion of the timing T1, setting the reset signal φRST to a lower voltage resets the gates of all pixels to an OFF state. And the reset state of the voltage Vfd of the FD section finishes. At this moment of time, reset noise Vfdnoise associated with the reset operation occurs on the voltage Vfd of the FD section.

FIG. 6(b) illustrates a schematic drawing showing a potential state of each portion of a pixel at the timing T3. As described above, the signal electric charge Qpd, which has been converted from the light beams of the subject to electric signals at the PD section, is accumulated in the parasitic capacity Cpd. The electric charge Qpd is accumulated in the parasitic capacitor Qpd according to the linear characteristic until the potential of the PD reaches to the potential Vtg of the transfer gate TG (the area of QLN in FIG. 6(b)). When the potential of the PD section exceeds the potential Vtg of the transfer gate TG, the current/voltage conversion is performed based on the sub-threshold character of the transfer gate TG. Then, the electric charge, into which the signal electric charge Qpd has been logarithmically compressed, is accumulated in the parasitic capacitor Cpd of the PD section (the area of QLOG in FIG. 6(b)). Namely, the potential Vtg of the transfer gate TG is a voltage, which denotes an inflection point.

The potential Vtg of the transfer gate TG is expressed as shown in equation (1) with the threshold voltage Vth of the transfer gate TG of a certain pixel and the middle voltage VM of the transfer signal φTX.

$$Vtg = VM - Vth \quad (1)$$

Since, the middle voltage VM is given as a middle voltage of the transfer signal φTX, Vtg is determined by the value of Vth.

$$Vth = VM - Vtg \quad (2)$$

As described in FIG. 4, the threshold voltage Vth of the transfer gate TG varies pixel by pixel. Assuming that the variation of the threshold voltage of pixels is ΔVth, the potential of the transfer gate Vtg varies within the ΔVth. The boundary, which is an inflection point, between the QLN area as shown in FIG. 6(b) where electrical charge Qpd is accumulated according to a linear characteristic and the QLOG area as shown in FIG. 6(b) where the electrical charge into which the signal electric charge Qpd is logarithmically compressed is accumulated in the parasitic capacitor Cpd of the PD section, varies and results in an occurrence of the variation of the inflection point. The threshold value Vth has a temperature characteristic. Thus, the variation of the inflection points has a temperature characteristic.

The description above relates to an operation, which is simultaneously performed for all pixels.

In FIG. 5(b), setting the read out signal φVX (φVXn) of the "n-th" horizontal row to the high voltage at the timing of T4 allows a transistor Q4 to be turned on. Thus, the voltage of Vfd (here, reset noise Vfdnoise) of the FD section is derived to the vertical signal line 162j as a pixel output VOUT of the pixel 162b. As a result, the pixel output VOUT of all the pixels on the "n-th" horizontal row is held in one of the capacitor in the sample & hold circuit as reset noise data NOISEn of the "n-th" horizontal row.

AT the timing of T5, setting the transfer signal φTX (φTXn) of the "n-th" horizontal row to the high voltage VH allows the transfer gate TG to be turned on. Thus the signal electric charge Qpd accumulated in the parasitic capacitor Cpd of the PD section is completely transferred to the FD section. At this moment, the reset noise Vfdnoise resides in the FD section. Accordingly, the reset noise Vfdnoise is superimposed onto the signal output Vfdsignal based on the signal electric charge Qpd.

Each potential status of a certain pixel at this moment is illustrated in FIG. 6(c). As described above, setting the transfer signal φTX (φTXn) to the high voltage VH under the condition that the reset gate RG is turned off and the FD section and the reset voltage φRSB are separated, allows the transfer gate TG to be turned on. Then the signal electric charges Qpd accumulated in the parasitic capacitor Cpd of the PD section are completely transferred to the FD section (Vfdsignal) to superimpose the Vfsignal onto the reset noise Vfdnoise.

At the timing of T6, setting the read out signal φVX (φVXn) of the "n-th" horizontal row to the high voltage allows a transistor Q4 to be turned on. Thus, the voltage of Vfd (here, Vfdsiganl+Vfdnoise) of the FD section is derived to the vertical signal line 162j as a pixel output VOUT of the pixel 162b. As a result, the pixel output VOUT (SIGNALn+NOISEn) of all the pixels on the "n-th" horizontal row are held in the other capacitor in the sample & hold circuit 162d. Then the reset noise data NOISEn is subtracted from the pixel output VOUT (SIGNALn+NOISEn), which is so called a CDS (correlated double sampling). As a result, an image signal element SIGNALn, from which the noise element is removed, is generated. Then, at the timing of T7, the image signal component SIGNALn is outputted to an amplifier 163 as imaged data 162k (SIGNALn) through an output circuit 162e and an output amplifier 162g in response to the horizontal transfer signal φH.

Next, a method for detecting the threshold Vth of the transfer gate, namely, the potential Vtg of the transfer gate TG, which shows the inflection point described above, that is to say a reset mode will be described by using FIGS. 7(a), (b) and (c) and FIGS. 8(a), 8(b) and 8(c), will be described below.

Figure 7A:
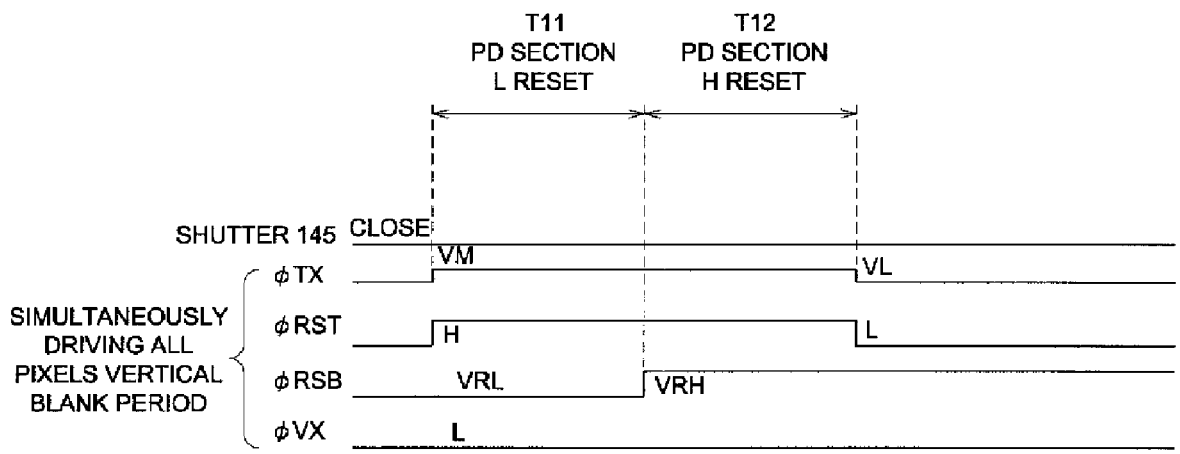
FIGS. 7(a) and 7(b) illustrate a timing chart for showing an operation when detecting a threshold of the image pickup device.
Figure 7B:
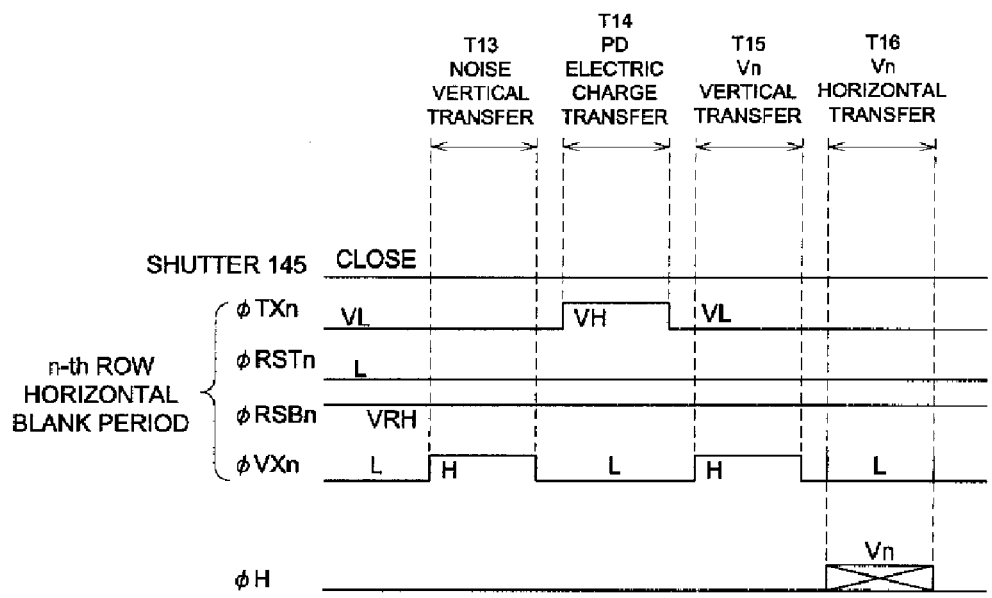
Figure 8:
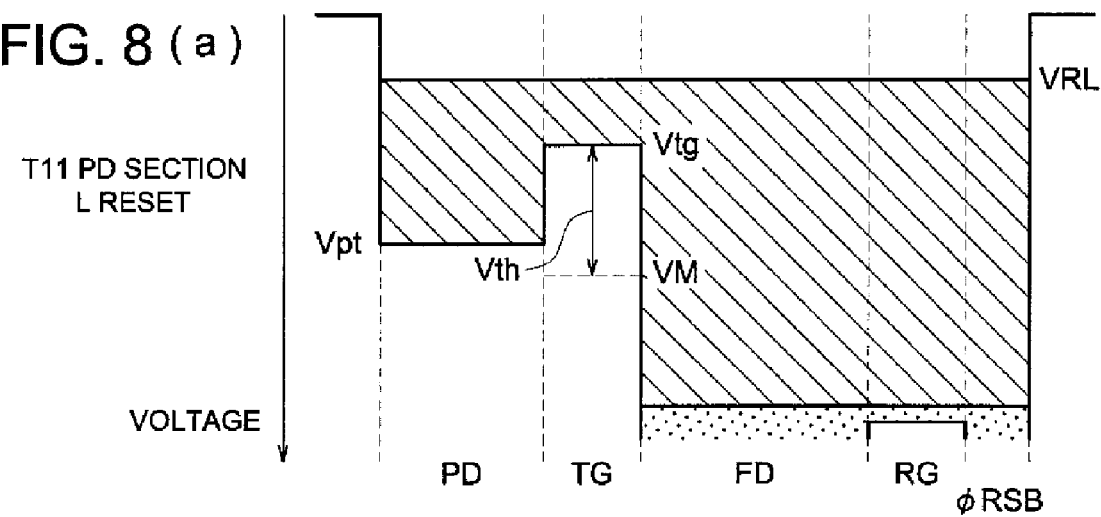
FIG. 8(a) illustrates a schematic diagram showing potential of each portion of a pixel at the timing of T11 illustrated in FIG. 7(a).
FIG. 8(b) illustrates a schematic diagram showing potential of each portion of a pixel at the timing of T12 illustrated in FIG. 7(a).
FIG. 8(c) illustrates a schematic diagram showing potential of each portion of a pixel at the timing of T13 illustrated in FIG. 7(b).
Figure 8:
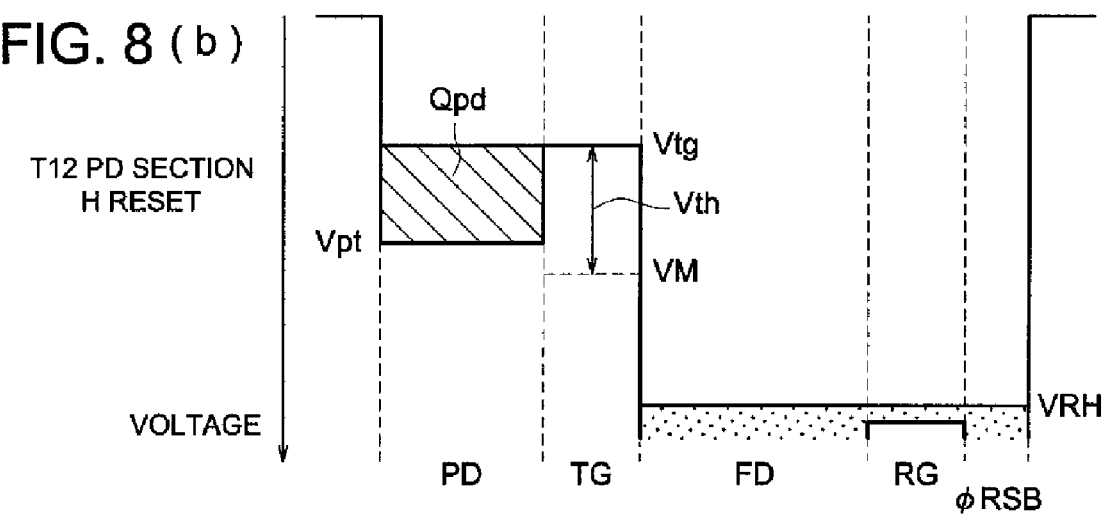
Figure 8:
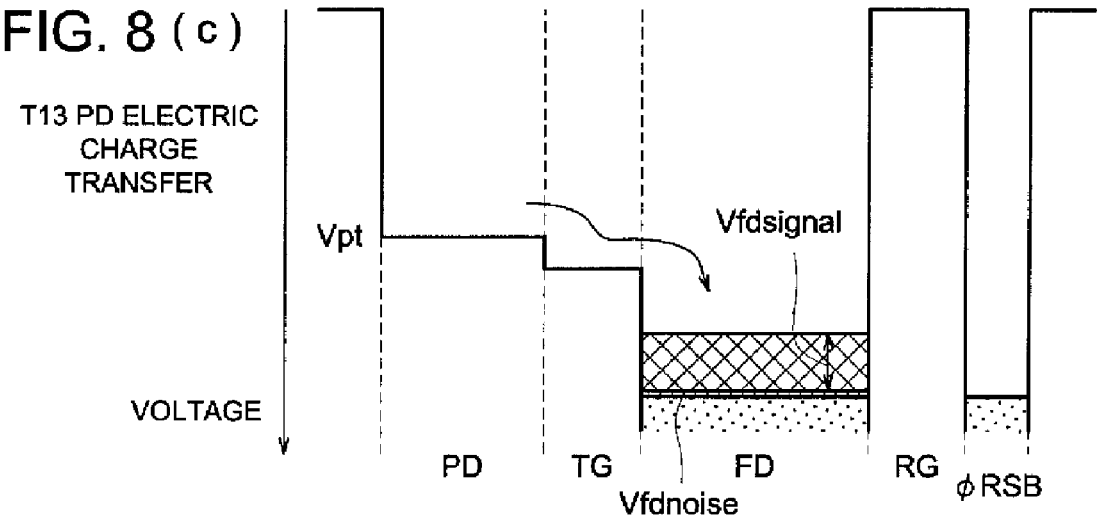

FIGS. 7(a) and 7(b) illustrate a timing chart showing an operation when the potential Vtg of the transfer gate TG is detected. FIG. 7(a) illustrates a timing chart of double reset operation of the PD section, which is simultaneously performed for all pixels. FIG. 7(b) illustrates an operational timing chart of read out operation for the potential Vtg sequentially performed on each horizontal row. In this method, these operations are conducted while the shutter 145 is in a closed state (under the light shielding condition).

FIGS. 8(a), 8(b) and 8(c) illustrate schematic diagrams showing each potential of the PD section, the transfer gate TG, the FD section and the reset gate RG and the potential of the reset voltage φRSB at each timing shown in FIGS. 7(a) and 7(b).

In FIG. 7(a), while the shutter 145 remains closed, setting the reset voltage φRSB to the low voltage VRL, setting the reset signal φRST to the high voltage at the timing of T11 and setting the transfer signal φTX to the middle voltage VM allow the PD section together with the FD section to be turned into low potential. And the PD section and the FD section are filled with electric charge as shown in FIG. 8(a). In other words, the reset voltage φRSB is set to the low voltage VRL so that the PD section and the FD section are filled with electric charges. This is the first reset operation.

Next, at the timing of T12, setting only the reset voltage φRSB to the high voltage VRH from the situation of the timing of T11 resets the electric charge among the electric charges filled in the PD section having potential exceeds the potential Vtg of the transfer gate TG and all the electric charges filled in the FD section in a certain pixel as shown in FIG. 8(b). This is the second reset operation. Accordingly, the electrical charges having potential less than the potential of the transfer gate TG not more than Vtg, namely the maximum electrical charges Qpd, which can be accumulated in the linear characteristic reside in the parasitic capacitor of the PD section. The Qpd can be expressed as following formula (3) by using the parasitic capacitor value Cpd.

$$Qpd = Cpd \cdot (Vpt - Vtg) \qquad (3)$$

In the FIG. 7(a), at the last portion of the timing of T12, setting the reset signal φRST to the low voltage allows the reset gate RG to be turned off. At the same time, setting the transfer signal φTX to the low voltage VL allows the transfer gate to be turned off. As a result, the FD section is separated from both the PD section and the reset voltage φRSB. At this moment, the reset noise Vfdnoise associated with the reset operation occurs on the voltage Vfd of the FD section. The description above is the operation, which is simultaneously performed over the all pixels.

At the timing of T13 as illustrated in FIG. 7(b), setting the read out signal φVX (φVXn) of the "n-th" horizontal row to the high voltage allows the transistor Q4 to be turned on and the voltage Vfd (here reset noise Vfdnoise) of the FD section to be derived onto the vertical signal line 162j as pixel output OUT of the pixel 162b. And the pixel output VOUT of all pixels of the "n-th" horizontal row are held in one of the capacitor of the sample & hold circuit 162d as reset noise NOISEn of the "n-th" horizontal row.

At the timing of T14, setting the transfer signal φTX (φTXn) of the "n-th" horizontal row to the high voltage VH allows the transfer gate to be turned on and the signal electric charges Qpd expressed by the formula (3) accumulated in the parasitic capacitor Cpd of the PD section to be completely transferred to the FD section. At this moment, since the reset noise Vfdnoise resides in the FD sections, the voltage of the FD section Vfd becomes the voltage, which is equal to the signal output Vfdsignal based on the signal electric charges Qpd expressed by the formula (3) onto which the reset noise Vfdnoise is superimposed.

FIG. 8(c) illustrates a schematic diagram showing F the potential of each portion of a pixel at the timing described above. As described above, setting the transfer signal φTX (φTXn) to the high voltage VH while the reset gate RG is turned off and the FD section is separated from the reset voltage φRSB, allows the transfer gate TG to be turned on and the signal electric charges expressed by the formula (3) accumulated in the parasitic capacitor Cpd of the PD section to be completely transferred to the FD section. As a result, the signal electric charges expressed by the formula (3) is superimposed onto the reset noise Vfdnoise. When assuming that the parasitic capacitor denotes Cfd, $$Qpd = Cfd \cdot Vfdsingla, \text{ and from formulas (1) and (3),} \qquad (4)$$

$$Vfdsignal = Qpd/Cfd$$

$$= (Cpd/Cfd) \cdot (Vpt - Vtg)$$

$$= (Cpd/Cfd) \cdot (Vpt - (VM - Vth))$$

Accordingly, from the formula (4) the threshold voltage Vth of the transfer gate TG, which denotes an inflection point can be detected by reading out the voltage Vfdsignal of the FD section of all the pixels. In practice, the potential Vpt of the PD section varies. However, from the formula (4), since the variation of Vpt can be treated the same as the variation ΔVth of the threshold voltage Vth of the transfer gate, the variation ΔVth including the variation of the potential Vpt of the PD section may be deemed as the variation ΔVth of the threshold voltage Vth of the transfer gate. In the correction method for correcting the variation of the inflection points, which will be described later, the variation of the threshold voltage including the variation of the potential Vpt of the PD section will be corrected as the variation of the inflection points.

At the timing of T15, the same as the timing of T13, setting the read out signal φVX (φVXn) of the "n-th" horizontal row to the high voltage allows the transistor Q4 to be turned on and the voltage Vfd (here reset noise Vfdsignal+Vfdnoise) of the FD section to be derived onto the vertical signal line 162j as pixel output VOUT of the pixel 162b. And the pixel output OUT of all pixels of the "n-th" horizontal row is held in one of the capacitor of the sample & hold circuit 162d as (SIGNALn+NOISEn) signals of the "n-th" horizontal row. Then the (SIGNALn+NOISEn) signals are subtracted from the reset noise data NOISEn of the "n-th" horizontal row described above (so to speak CDS; Correlated Double Sampling) to generate signal element SIGNALn from which noise element is removed under the reset mode. At the timing of T16, in response to the horizontal transfer signal φH, the pixel output VOUT is outputted to amplifier 163 as imaged data 162k (SIGNALn) under the reset mode through the output circuit 162e and the output amplifier 162g.

Figure 9:
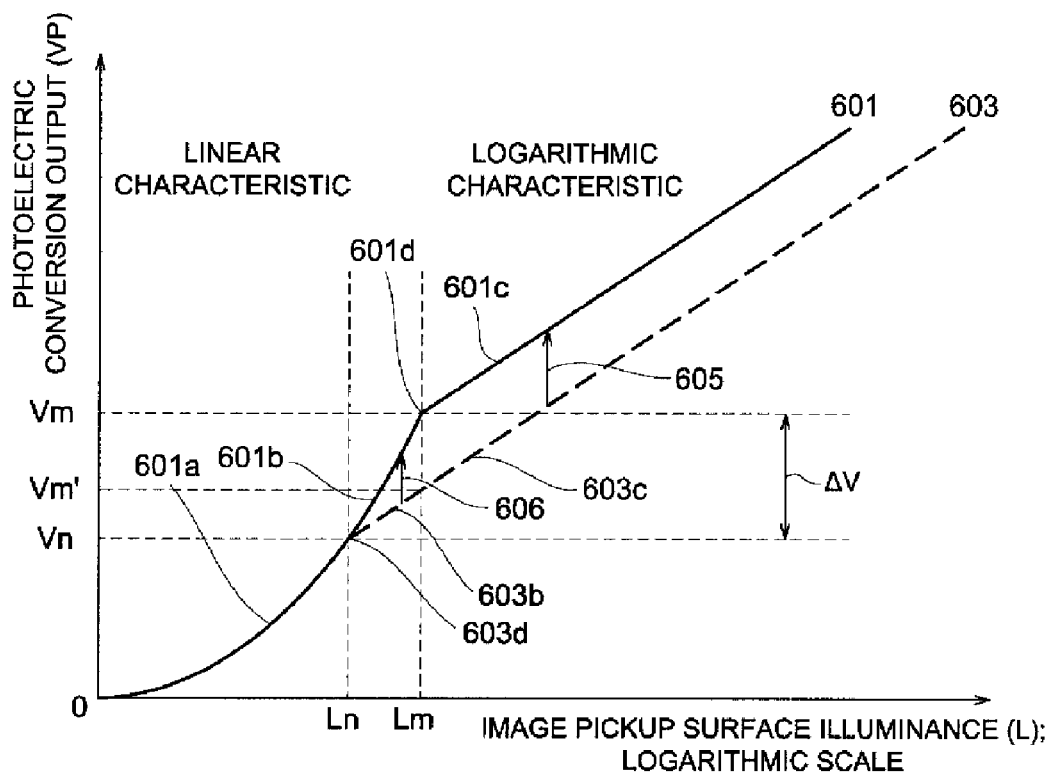
FIGS. 9(a) and 9(b) illustrate a schematic diagram for showing a method for correcting inflection point variation.
Figure 9:
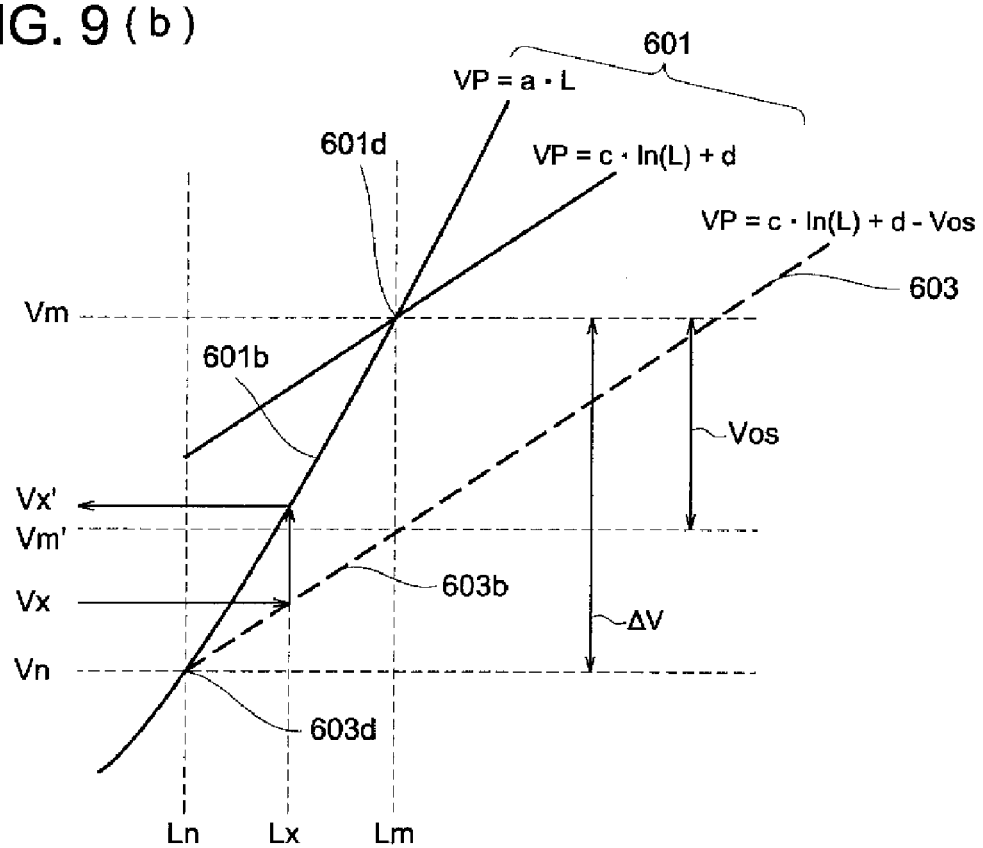

Next, a method for correcting variation of the inflection point of the present invention will be described below by using FIGS. 9(a) and 9(b). FIGS. 9(a) and 9(b) illustrates schematic diagrams for showing the method for correcting the variation of the inflection points. FIG. 9(a) shows a photoelectric conversion characteristic for illustrating the correction method. FIG. 9(b) is an enlarged drawing of the area adjacent to the inflection points 601d and 603d of FIG. 9(a), which describes the method for calculating the correcting amount of the inflection point variation. The same number is given to the same portion in FIG. 16(a). In the FIGS. 9(a) and 9(b), in order to correspond FIGS. 9(a) and 9(b) with FIGS. 16(a) and 16(b), the photoelectric conversion output VP is arranged to become large as the image pickup surface illuminance L becomes large. However, in the examples illustrated in FIG. 4 and FIGS. 5(a) and 5(b), the photoelectric conversion output VP becomes small as the image pickup surface illuminance L becomes large. In this case, it is possible to understand the photoelectric conversion characteristic by turning FIGS. 9(a) and 9(b) up side down.

Here, Vm (it will be called inflection point data hereinafter) denotes a photoelectric conversion output at the inflection point 601d which is an inflection point on an imaged data 162k in the reset mode shown in FIGS. 7(a) and 7(b) and FIGS. 8(a), 8(b) and 8(c) of a pixel (it will be called a standard pixel) having a standard characteristic 601, which is a standard photoelectric conversion characteristic of photoelectric conversion characteristics of all pixels. Vn denotes an inflection point data at the inflection point 603d which is an inflection point on an imaged data 162k in the reset mode shown in FIGS. 7(a) and 7(b) and FIGS. 8(a), 8(b) and 8(c) of a pixel (it will be called a comparative pixel) having a comparative characteristic 603, which is a photoelectric conversion characteristic in which the inflection point is shifted from a standard photoelectric conversion characteristic. Lm is defined as an illuminance at the inflection point 601d. Ln is defined as an image pickup surface illuminance at the inflection point 603d.

With regard to the standard characteristic, the standard characteristic may be defined based on a standard pixel being a particular pixel, for example, having a maximum inflection point, having a mean value or a minimum value of inflection point of all pixels of the image pickup device or having a inflection point of photoelectric conversion characteristic of a virtual pixel. In the embodiment of the present invention, in order to make it simple to calculate the inflection point correction, which will be described below, the standard characteristic is defined based on a pixel having a maximum inflection point, the pixel which is appointed as a standard pixel.

When examining the comparative characteristic 603 of comparative pixels in comparison with the standard characteristic 601 of the standard pixels in FIG. 9(a), since the standard characteristic 601 and the comparative characteristic 603 coincide each other in the portion where the photoelectric conversion output Vp is lower than the inflection point 603d within a linear characteristic portion 601a of the standard characteristic 601, the correction will not be performed.

Figure 16:
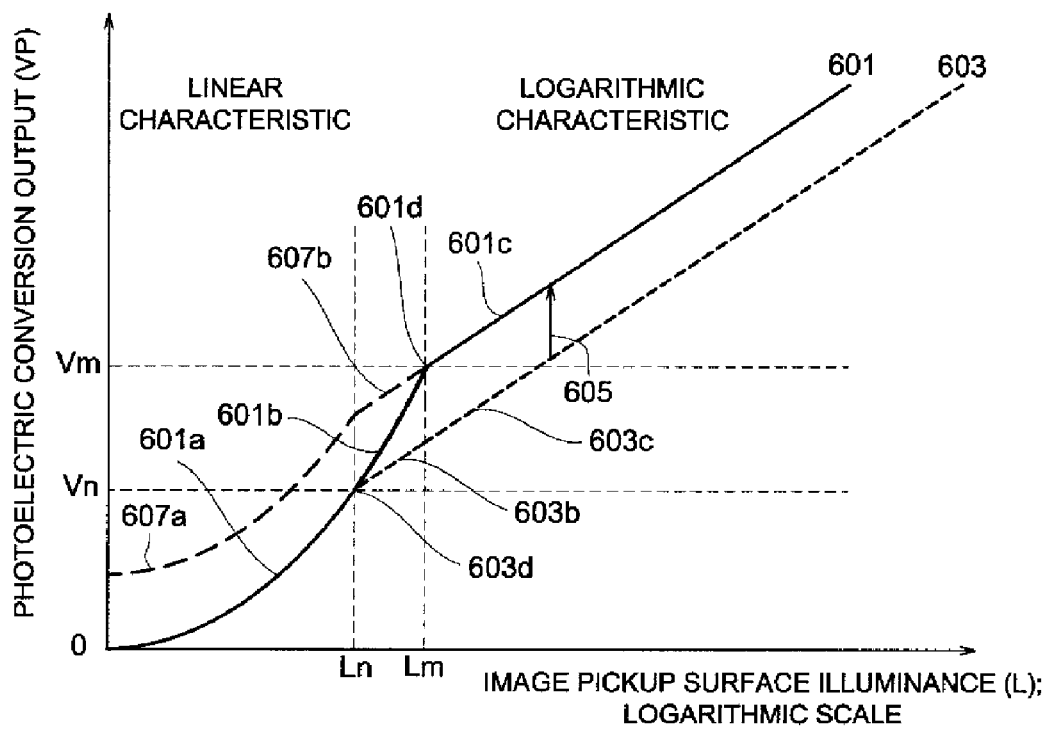
FIG. 16(a) illustrates a schematic diagram showing a graph of two photoelectric conversion characteristics having an inflection point variation.
FIG. 16(b) illustrates a schematic diagram showing a temperature characteristic of the inflection point.
Figure 16:
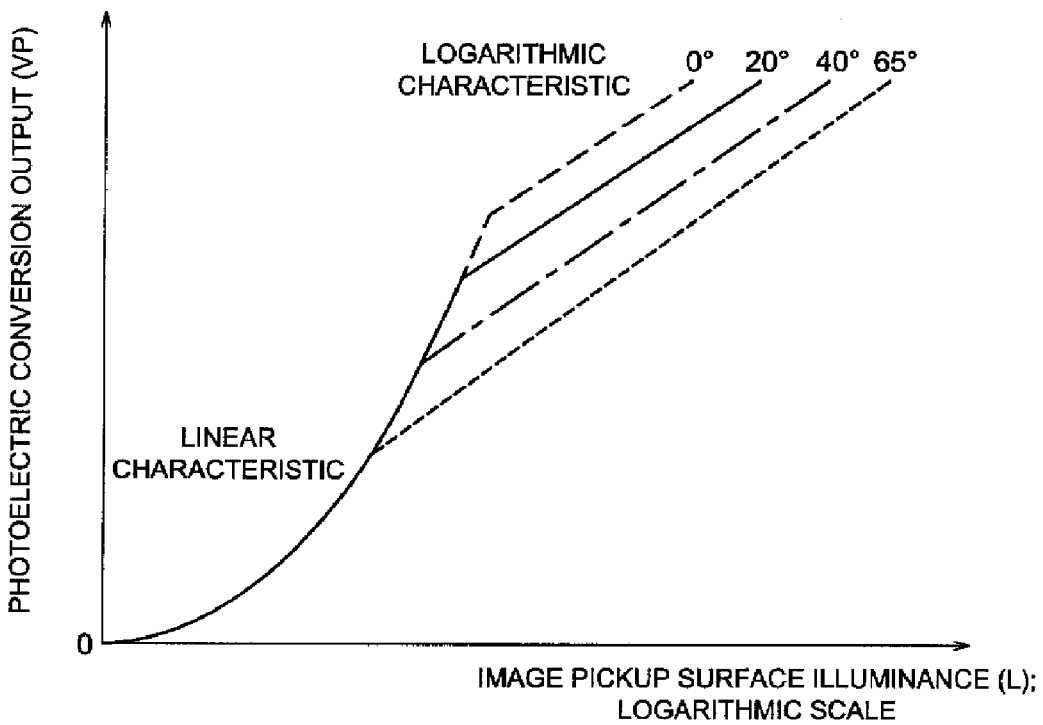

With regard to the portion where the image pickup surface illuminance L is brighter than that at the inflection point 601d in the logarithmic characteristic portion 601c of the standard characteristic 601 and the logarithmic characteristic portion of the comparative characteristic 603, as described in FIG. 16(a), in order to match the logarithmic characteristic 603c to the logarithmic characteristic 601c, a parallel shift (it will be called offset hereinafter) 605 will be conducted. Here, a parallel shift amount (it will be called offset value Vos hereinafter) and the lower limit value Vm' of the photoelectric conversion output for conducting the inflection point correction based on the offset will be obtained below.

Figure 10:
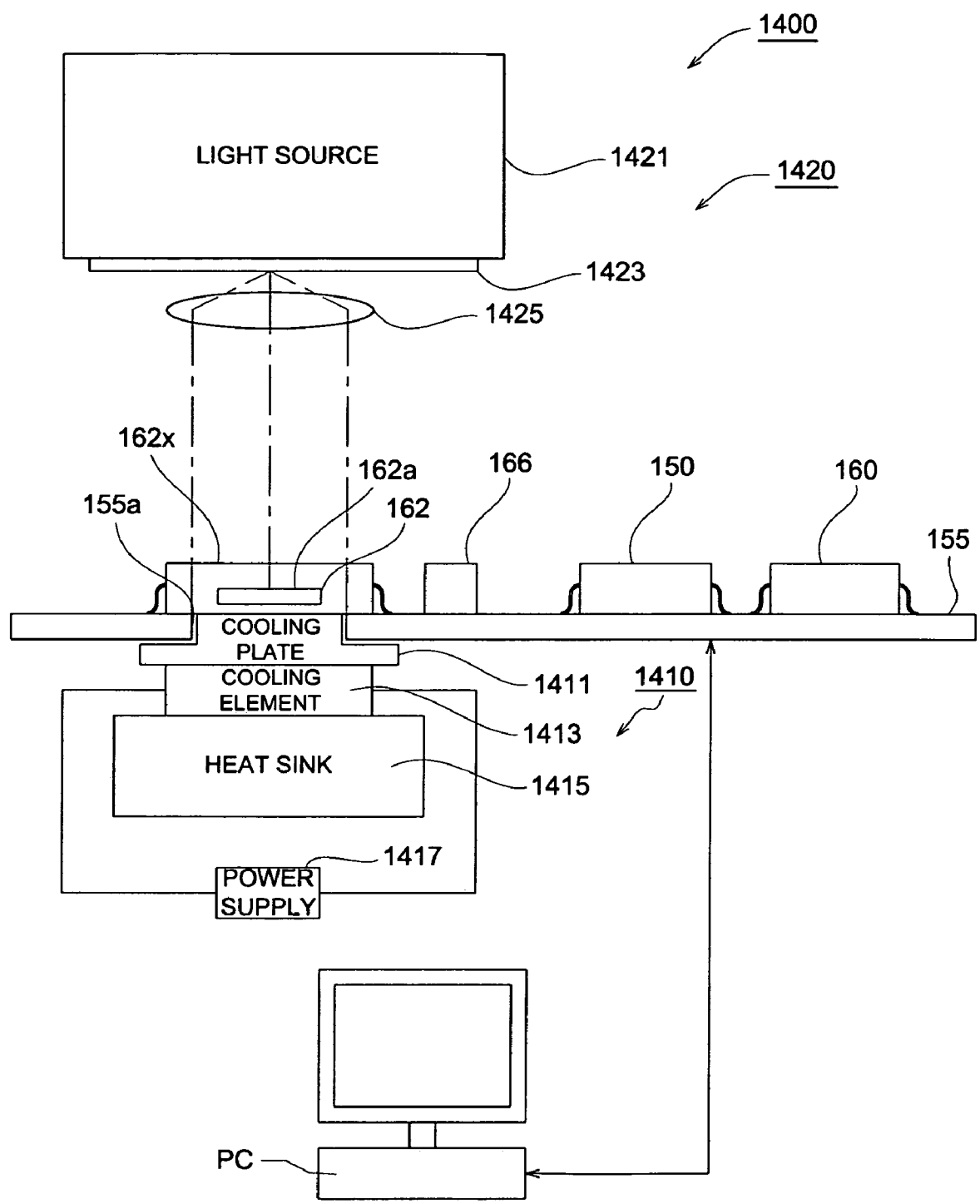
FIG. 10 illustrates a schematic diagram for showing an example of a method for measuring constant numbers (a, c and d) and standard inflection point data Vm under the plural temperature conditions.

The standard characteristics 601 in the linear characteristic area and the logarithmic characteristic area are respectively expressed as following formulas (5) and (6).

$$VP = a \cdot L \quad (5)$$

$$VP = c \cdot \ln(L) + d \quad (6)$$

Where a, c and d are constant numbers given by the measurement value of the standard characteristic 601 illustrated in FIG. 10, which will be described later. Further, from the formula (6), the comparative characteristic 603 in the logarithmic area will be expressed as a following formula (7).

$$VP = c \cdot \ln(L) + d - Vos \quad (7)$$

Setting that the image pickup surface illuminance at the inflection point 601d is Lm, and the image pickup surface illuminance at the inflection point 603d is Ln, the inflection point 603d is expressed as following formulas (8) and (9) from formulas (5) and (7).

$$Vn = a \cdot Ln \quad (8)$$

$$Vn = c \cdot \ln(Ln) + d - Vos \quad (9)$$

From formula (8), Ln=Vn/a can be derived. Then, substitute this into formula (9) and make an arrangement so that formula (10) is derived.

$$Vos = c \cdot \ln(Vn/a) + d - Vn \quad (10)$$

Thus, the offset value Vos will be obtained from constant numbers a, b and c, which are given from the measurement results of the standard characteristic 601 and the imaged data of the inflection point 603d of the comparative characteristic 603.

Next, In FIG. 9(b), the inflection point data Vm' at the point where the image pickup surface illuminance is Lm will be derived from the formula (7) as following.

$$Vm' = c \cdot \ln(Lm) + d - Vos \quad (11)$$

The image pickup surface illuminance Lm will be expressed by using the inflection data Vm of the inflection point 601d of the standard characteristic 601 as a following formula (12).

$$Lm = Vm/a \quad (12)$$

Substituting the formulas (10) and (12) into the formula (11) and arranging it produces a following formula (13), which gives the lower limit value Vm' of the photoelectric conversion output for performing the inflection point correction based on the offset.

$$Vm' = Vn + \ln(Vm/Vn) \quad (13)$$

Next, with regard to the portion where the standard characteristic is the linear characteristic 601b and the comparative characteristic 603 is the logarithmic characteristic 603b, (which corresponds the portion where the photoelectric conversion output is from Vn to Vm'), applying a characteristic conversion 606 from logarithm to linear onto the logarithmic characteristic 603b matches the logarithmic characteristic 603b to the linear characteristic 601b.

When Vx (Vn<Vx<Vm') is given as imaged data of the comparative characteristic, converted imaged data Vx', in which a characteristic conversion from the logarithmic characteristic to the linear characteristic is conducted can be obtained as following. Assuming that the image pickup surface illuminance where the imaged data of the comparative characteristic becomes Vx is Lx, the following formula (14) will be derived from the formula (7).

$$Vx = c \cdot \ln(Lx) + d - Vos \quad (14)$$

The Lx is obtained from formula (14) as following.

$$Lx = \exp((Vx - d + Vos)/c) \quad (15)$$

Accordingly, the output Vx', in which the characteristic conversion has been done is expressed as a following formula (16).

$$Vx' = a \cdot Lx \quad (16)$$
$$= a \cdot \exp((Vx - d) + Vos)/c)$$

Where a, c and d are constant numbers, which are given from the measurement value of the standard characteristic 601 and the Vos is a value given by the formula (10).

The above descriptions will be summarized as following. (1) When the imaged data of the comparative characteristic≦Vn, the inflection point correction will not be performed. (2) When Vn<the imaged data of the comparative characteristic<Vm' (where Vm' is given by the formula (13)), the characteristic conversion of the formula (16) is applied to the image data of the comparative characteristic as the inflection point correction. (3) When, Vm'≦the imaged data of the comparative characteristic (where Vm' is given by the formula (13)), the offset given by the formula (10) will be applied to the imaged data of the comparative characteristic as the inflection point correction.

Here, the inflection point data Vm of the inflection point of the standard pixel and the inflection point data Vn of the inflection point of the comparative pixel, which are imaged data obtained by actually taking a photograph while the shutter 145 remains closed under a situation of actual image pickup, are the values including the variation of the temperature characteristic of the threshold voltage of the transfer gate TG of the pixel. Meanwhile, the constant numbers (a, c and d) of the standard characteristic 601 are the constant numbers, which are given from the standard characteristic 601 measured in advance. Accordingly, the constant numbers (a, c and d) do not include the temperature characteristic.

Accordingly, when performing an actual inflection point correction, it is preferable to measure the constant numbers (a, c and d) and the standard inflection point data under the plural temperature conditions and to memorize them together with the temperature data in the data memory 154. Further it is preferable to selectively use the most optimum constant numbers (a, c and d) for the temperature condition of the image pickup device 162 and the standard inflection point data Vm from the memorized constant numbers (a, c and d) based on the temperature detection results in the area adjacent to the image pickup device 162 or the image pickup device 162 located inside the digital camera 1. When memorizing only the constant numbers (a, c and d) and the standard inflection point data Vm under the plural temperature conditions, small memory capacity will be enough to memorize them.

Next, the measuring method of the constant numbers (a, c and d) and the standard inflection point data Vm under the temperature conditions described above will be described by using FIG. 10. FIG. 10 illustrates a schematic diagram for showing an example of a method for measuring constant numbers (a, c and d) and standard inflection point data Vm under the plural temperature conditions.

The image pickup device 162 installed in a package 162x, a temperature sensor 166 for detecting the temperature adjacent to the image pickup device 162 and an adjacent area thereof, the camera control section 150 including the data memory 154 therein and the image pickup circuit 160 including the image processing section 165 are installed on an image pickup device board 155. The image pickup device board has a hole 155a at the position corresponding to the rear surface of the image pickup device 162.

A temperature detecting apparatus 1400 comprises a light source box 1421 disposed on the upper portion thereof, a light source surface 1423, a light source unit 1420 including a projection lens 1425, a cooling element 1413 of a Peltier element sandwiched by a cooling plate structured by a metal and a heat sink 1415, which is provided on the lower portion of the apparatus, a cooling unit 1410 having a power supply 1417 for driving the cooling element 1413, and a personal computer PC as a control apparatus, which is disposed outside of the temperature detecting apparatus 1400.

It has been known that when applying electric current to a cooling element being a Peltier element in a direction, one side of the element is cooled and the other side is heated. When changing the direction of the applied electric current, the cooled side and the heated side of the cooling element are reversed. Thus, the image pickup device 162 can be cooled or heated by the cooling element 1413 by inserting the upper portion of the cooling plate 1411 into the hole 155a of the image pickup device board 155 and driving the cooling element 1413 for cooling or heating.

The constant numbers (a, c and d) at a plurality of temperature points and a table of the standard inflection point data Vm will be obtained by following procedure.

Firstly, turn on the light source box 1421 and project the intensity of the light source surface 1423 to the image pickup surface 162a of the image pickup device 162 through the projection lens 1425. Then, detect the temperature of the image pickup device 162 or the space adjacent to the image pickup device 162, which has been cooled or heated by the cooling element 1413 by using the temperature sensor 166. Then calculate the temperature and the standard characteristic among the imaged data of the image pickup device 162 when the temperature is measured by using, for example, the personal computer disposed outside the temperature detecting apparatus 1400. Then, the constant numbers (a, c and d) under the certain temperature and the standard inflection point data Vm can be obtained. Then, the constant numbers (a, c and d) at a plurality of temperature points and a table of the standard inflection point data Vm will be obtained by writing the temperature, constant numbers (a, c and d) and the standard inflection point data Vm into the data memory 154.

According to this method, since the constant (a, c and d) and the standard inflection point data Vm are obtained from the imaged data, which have been measured under the temperature, which has been actually changed by changing the temperature of the image pickup device itself, the precise temperature is able to be reflected to the temperature characteristic.

In this embodiment, the cooling element 1413 is used to change the temperature of the image pickup device 162. However, the present invention is not limited to it. For example, in order to change the temperature of the image pickup device 162 by consuming power, continuously flowing electric current through the portion where power consumption is large on the image pickup device 162 (for example, a power source and an output section) will be possible.

Further, in order to detect the temperature of the image pickup device 162, the temperature sensor 166 is provided outside the image pickup device 162 in this embodiment described above. However, the present invention does not limit it to the temperature sensor 166. It is possible to provide a temperature detecting circuit on the image pickup device 162 or to calculate the temperature of the image pickup device 162 from the change of the slope in the plural logarithmic characteristic areas having different luminous intensities in the imaged data of the image pickup device 162. This is because since the logarithmic characteristic logically has characteristic expressed by $VP=kT/Q \cdot \ln(Ipd)$, where k is Boltzmann constant; T denotes absolute temperature; q denotes electric charge of an electron; and Ipd denotes photocurrent in the PD section), the temperature T can be calculated from the imaged data in the logarithmic characteristics having different luminous intensities.

Figure 11:
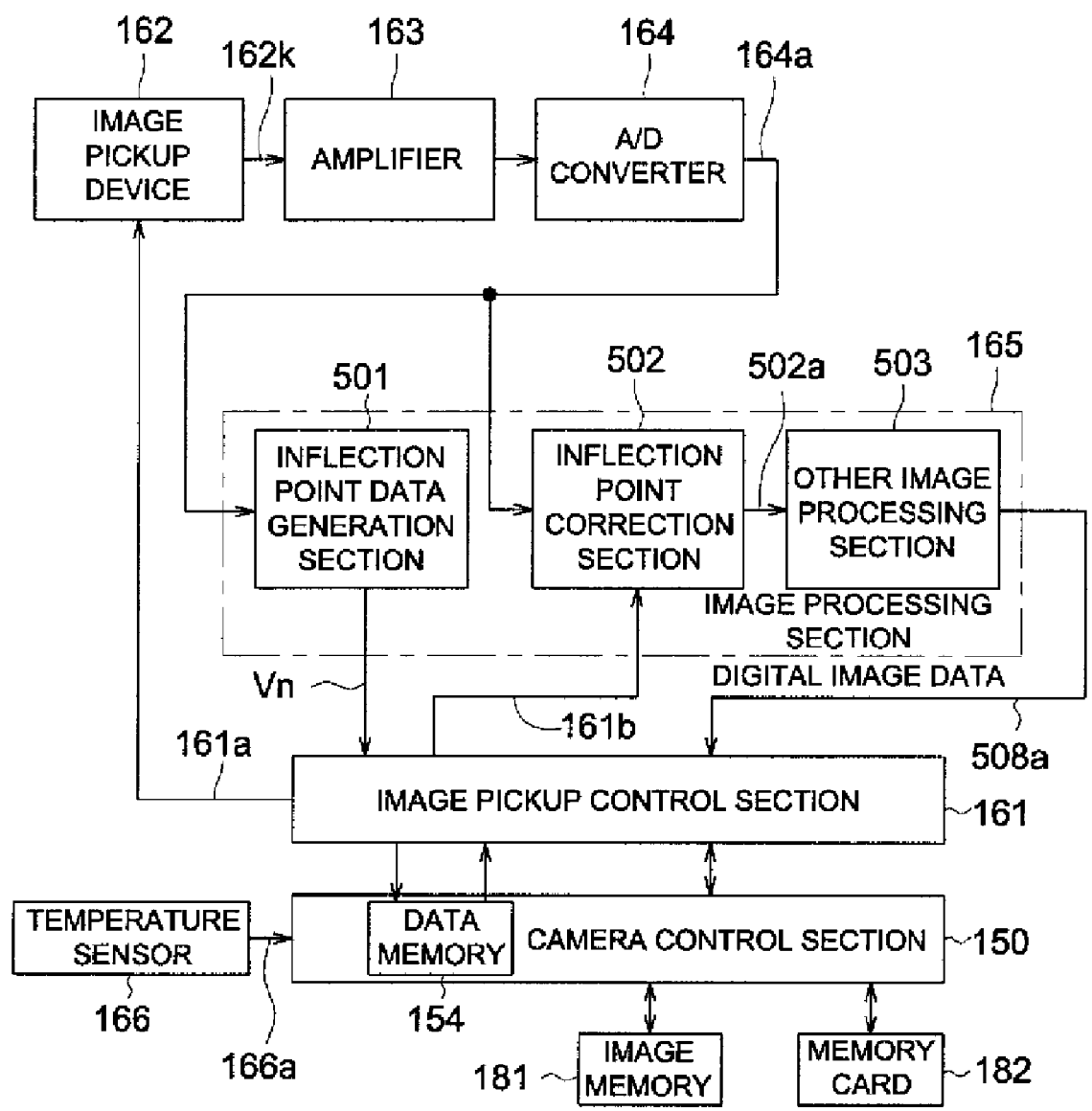
FIG. 11 illustrates a circuit block diagram for showing an example of a circuit configuration of an image processing section and its peripheral circuit.

Next, the configuration of the image processing section 165 for correction of the inflection point variation in the present invention illustrated in the circuit block diagram of FIG. 2 will be described hereinafter by using FIG. 11. FIG. 11 illustrates a circuit block diagram for showing an example of a circuit configuration of an image processing section 165 and its peripheral circuit. The same number is given to the same portion illustrated in FIGS. 2 and 3.

As described above, the imaged data 162k (an electric signal), which has been converted from the light amount by the image pickup device 162, is amplified. Then the electric signal is converted into the digital data 164a by the A/D converter 164 and further converted to digital image data 508a to which a predetermined digital processing has been applied by the image processing section 165. Finally the digital image data 508a is recorded on the memory card 182, after the digital image data 508a is temporarily recorded in the image memory 181 through the image pickup control section 161 and the camera control section 150.

At first, an image pickup control signal 161a for commanding an image pickup in the reset mode, which has been described in FIGS. 7(a) and 7(b) and FIGS. 8(a), 8(b) and 8(c), is transferred to the image pickup device 162 from the image pickup control section 161. The image pickup operation is performed while the shutter 145 remains closed in the reset mode. The imaged data 162k outputted from the image pickup device in the reset mode is inputted into an inflection point data generation section 501 through the amplifier 163 and A/D converter 164 as digital data 164*a* in the reset mode. Then the inflection point data Vn of all the pixels including the inflection point data Vm of the standard pixel is generated in the method described in FIGS. 7(*a*) and 7(*b*) and FIGS. 8(*a*), 8(*b*) and 8(*c*). Then the inflection point data Vn is memorized in the data memory 154 of the camera control section 150 through the image pickup control section 161. Since this inflection point data Vn is generated by photographed image, which has been actually photographed under a situation of image picking-up, the inflection point data Vn is a value expressing the inflection point including a temperature characteristic.

In normal image pickup operation, the image pickup control section 161 issues the image pickup control signal 161*a* for commanding an image pickup in the linear logarithmic characteristic to the image pickup device 162. The imaged data 162*k* of the linear logarithmic characteristic is inputted into an inflection point correction section 502 as a digital data 164*a* through the amplifier 163 and the A/D converter 164. Then the inflection point data Vn, which has been generated by the inflection point data generation section 501 associated with the reset mode, which has been set just immediately before, is read out and memorized in the data memory 154. The inflection point variation corrections are performed in the method described in FIGS. 9(*a*) and 9(*b*) by using the read-out inflection point data Vn corresponding to three cases.

At this moment, since it is necessary to conduct temperature correction of the constant numbers (a, c and d) of the standard characteristic to be used for the calculation for the inflection point correction, the camera control section 150 detects the temperature by using the temperature sensor 166. The most appropriate constant numbers (a, c and d) are read out from the data memory 154 from the measurement results and are sent to the inflection point correction section 502 through the image pickup control section 161.

Other image processing section 503 applies a white balance process, color interpolation, color correction, Y-correction and color space conversion to the inflection point corrected data 502*a*, the inflection point variation of which has been corrected. With regard to these other image processings, since they can be the same image processes used in the conventional camera, the explanation will be omitted here.

Figure 12:
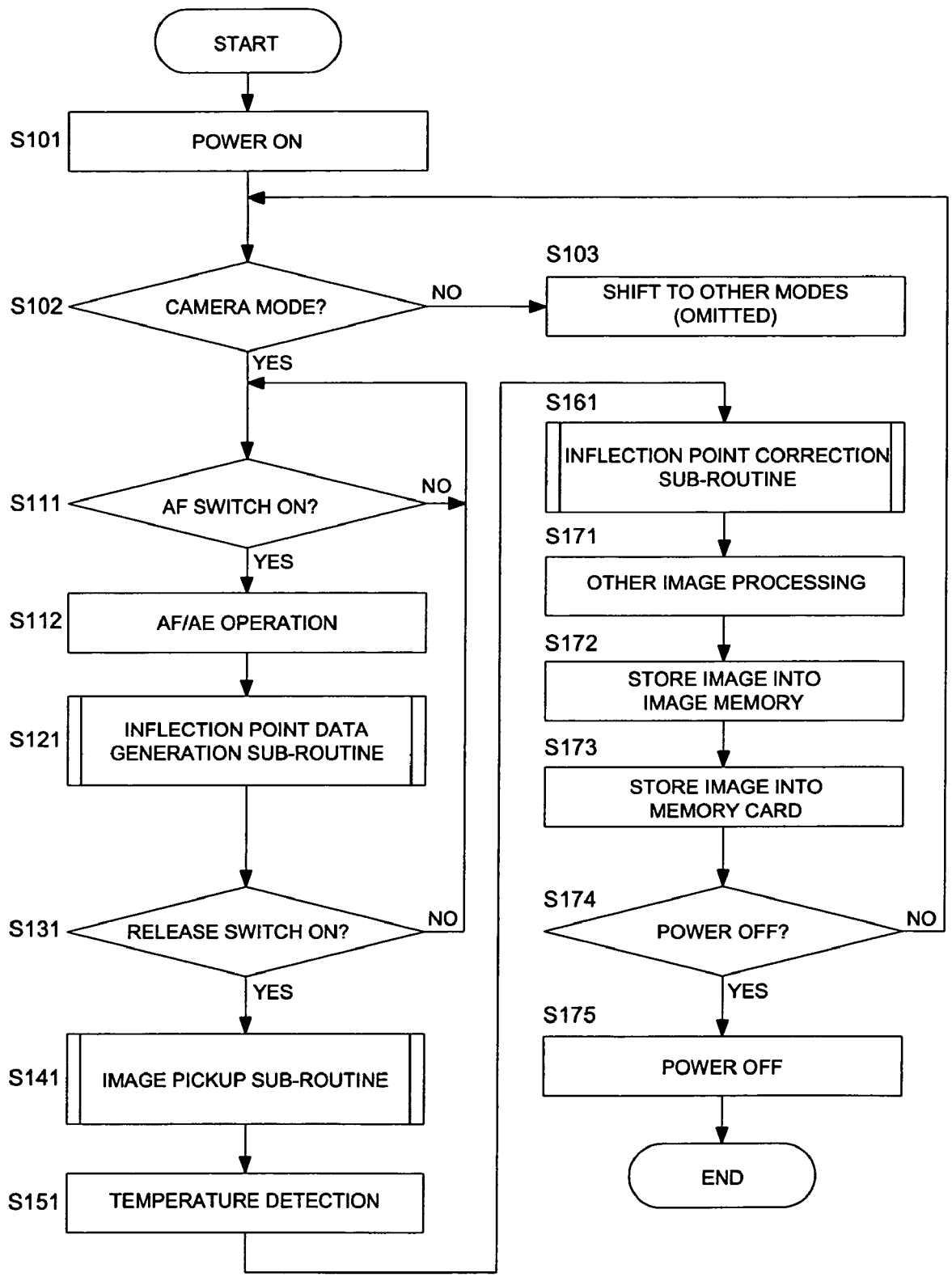
FIG. 12 illustrates a main routine of a flowchart showing an actual image pickup operation including a correction of the inflection point variation.
Figure 13:
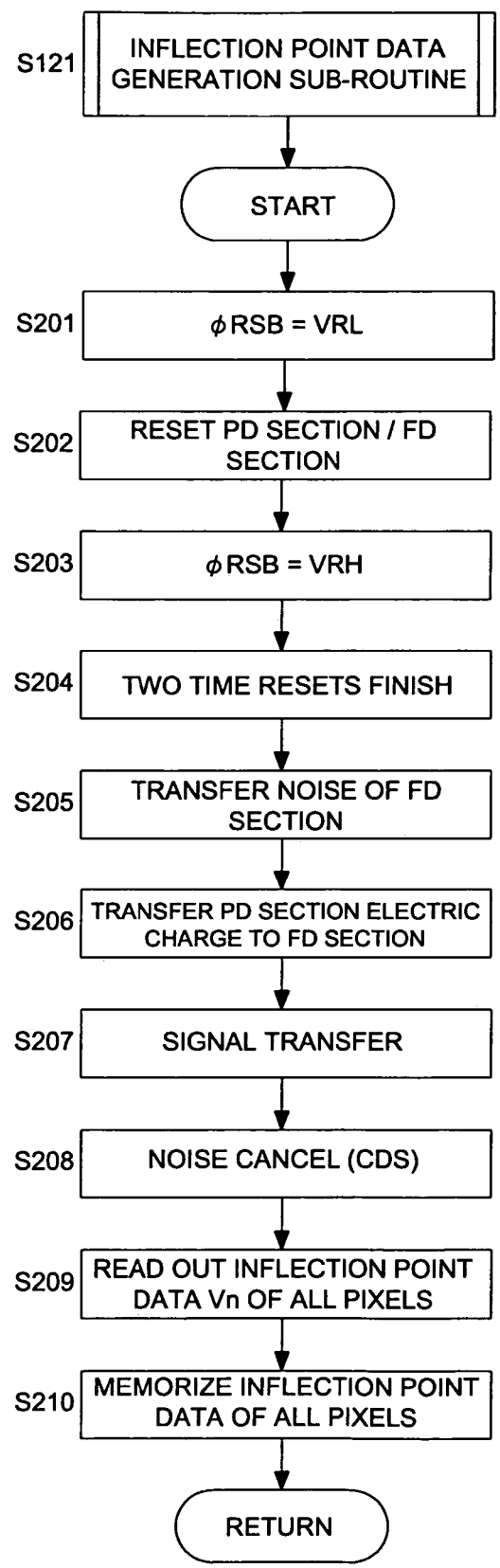
FIG. 13 illustrates a subroutine of a step S121 illustrated in FIG. 12.
Figure 14:
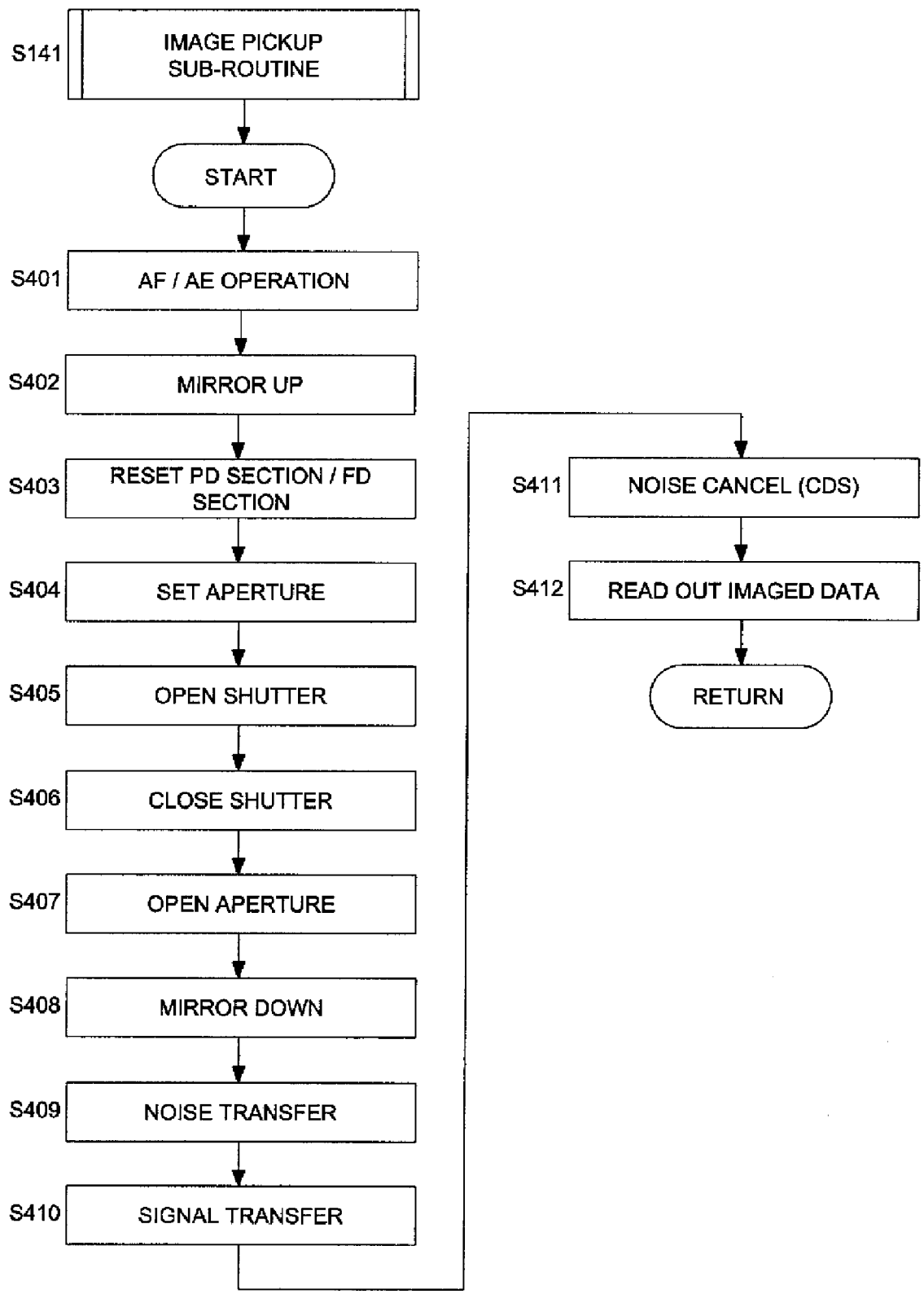
FIG. 14 illustrates a subroutine of a step S141 illustrated in FIG. 12.
Figure 15:
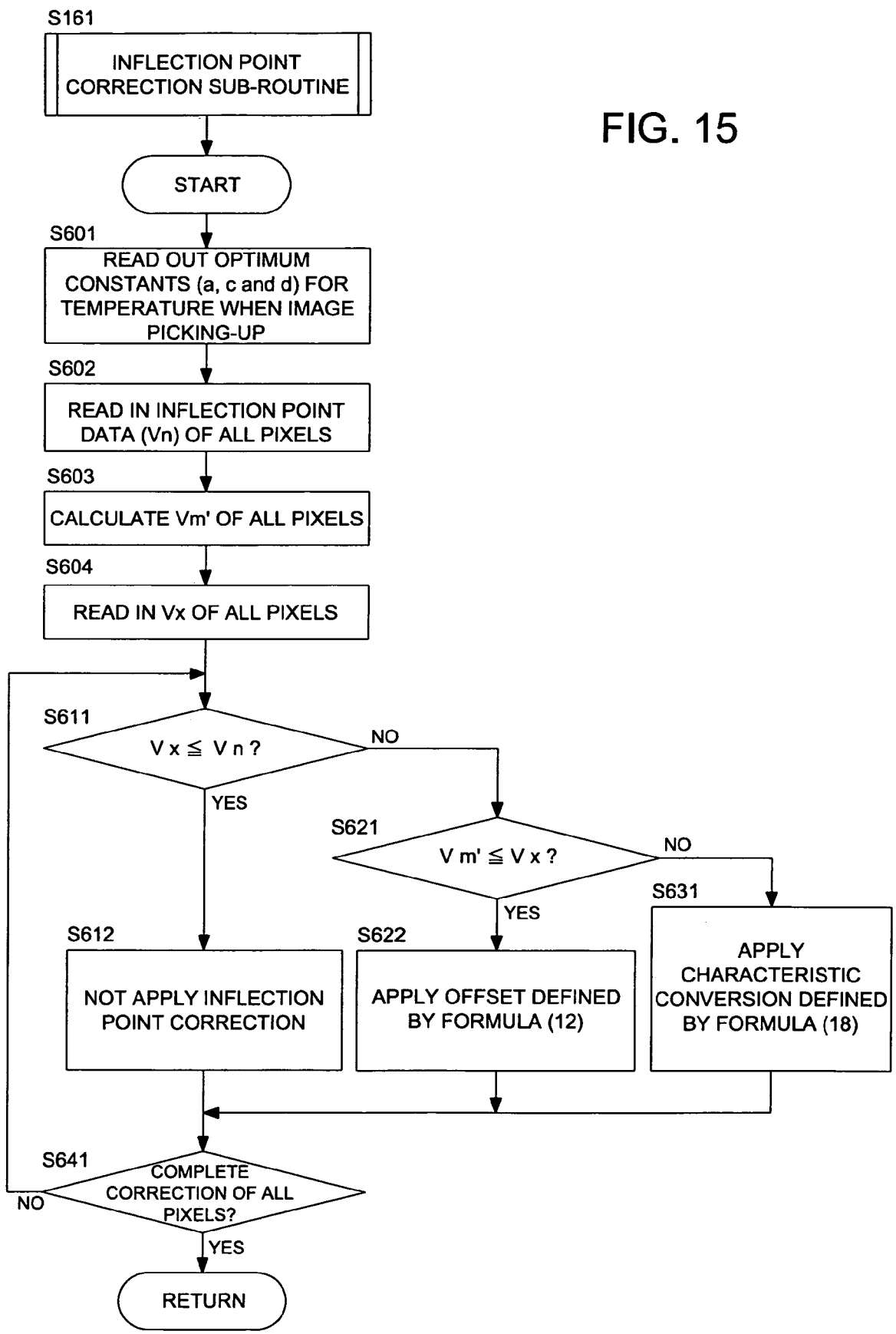
FIG. 15 illustrates a subroutine of a step S161 illustrated in FIG. 12.

Next, the flow of actual image pickup operation including the inflection point variation correction will be described by using FIGS. 12-15. FIG. 12 illustrates a main routine of a flowchart showing a real image pickup operation including a correction of the inflection point variation. FIGS. 13-15 illustrate a subroutine of FIG. 12.

In FIG. 12, when the power switch 111 of the digital camera 1 is turned on at the step of S101, the operation moves to a step S102. In the step S102, whether the operation mode of the digital camera 1 has been set to a camera mode is checked. When a mode, which is other than the camera mode (for example, a reproduction mode), has been set (step S102; NO), the operation moves to a step S103 and shifts into the control of the set mode. The description will be omitted here.

When the camera mode has been set (the step S102; YES), the operation moves to a step S111. In the step S111, whether a release button 101 is half pushed and an AF switch 101*a* is pushed to ON is checked. The operation remains at the step S111 until the release button 101 is half pushed and the AF switch is turned on (the step S111; YES), and the operation moves to a step S112. In the step S112, the operations of AF and AE are performed. Then a focusing operation of a lens 211 and a photometry operation are conducted. Then the operation moves to a step S121.

In the step S121, an inflection point data generation subroutine for generating the inflection point data from the image in the reset mode is executed. Then the inflection point data Vn of all the pixels is memorized in the data memory 154. Then the operation moves to a step S131.

In the step S131, whether the release button 101 is fully pushed and a release switch 101*b* is turned on is checked. The step S131 will be repeated until the step S111 is turned on. When the release switch is turned on (the step S131; YES), the operation moves to a step S141. In the step S141, an image pickup subroutine is executed. Then the operation moves to a step S151.

In the step S151, the temperature sensor 166 detects the temperature of the image pickup device 162 or space adjacent to the image pickup device 162. Then the operation moves to a step S161. In the step S161, the inflection point correction subroutine is executed according to the temperature detected in the step S151. Then the operation moves to a step S171. In the step S171, image process such as a white balance adjustment is conducted. Then operation moves to a step S172. In the step S172, the image data is temporarily stored into the image memory 181. Then operation moves to a step S173. In the step S173, the image data stored in the image memory 181 in the step S172 is finally stored in the memory card 182. Then the operation moves to a step S174.

In the step S174, whether the power switch 111 is turned off is checked. When the power switch 111 is turned off (the step S174; YES), the operation moves to a step S175. In the step S175, the power switch of the digital camera is turned off and the operation finishes. When the power switch of the digital camera is not turned off, (the step S174; NO), the operation returns to the step S102 and operations described above are repeated.

FIG. 13 illustrates an inflection point data generation subroutine of the step S121 in FIG. 12.

In the step S201, the reset voltage φRSB of the image pickup device 162 is set to the low voltage VRL. Then the operation moves to a step S202. In the step S202, the transfer signal φTX is set to the middle voltage VM and the gate voltage φRST of the reset gate RG is set to the high voltage. Accordingly, the PD section and the FD section are simultaneously reset to the low voltage VRL. Then the PD section and the FD section are filled with electric charges (which is in the state illustrated in FIG. 8(*a*)). Then the operation moves to a step S203. In the step S203, since the transfer signal φTX is set to the middle voltage VM and the reset voltage φRST is set to high voltage VRH while the gate voltage φRST of the reset gate remains the high voltage VRH, the electric charges expressed by formula (3) are accumulated in the PD section and the FD section are set to the high voltage VRH (the state illustrated in FIG. 8(*b*)). Then the operation moves to a step S204. In the step S204, setting the gate voltage φRST of the reset gate RG to the low voltage allows the reset gate RG to turn off and two time reset operations to finish. Then the operation moves to a step S205. In the step S205, the reset noise NOISE of the FD section is transferred to the sample & hold circuit 162*d* and the operation moves to a step S206. In the step S206, setting the transfer signal φTX to the high voltage VH allows the signal SIGNAL having the amplitude of the threshold voltage Vth accumulated in the PD section to be transferred to the FD section (the state illustrated in FIG. 8(*c*)). Then the operation moves to a step S207. In the step S207, the signal SIGNAL is transmitted to the sample & hold circuit 162*d* and the operation moves to a step S208.

In the step S208, the CDS (Correlation Double Sampling) operation of the sample & hold circuit 162*d* cancels the reset noise and the operation moves to a step S209. In the step S209, the image data, reset noise of which is cancelled, namely, the inflection point data Vn of the all pixels is read out (the timings T14 and T15 in the FIG. 7(b)) and the operation moves to a step S210. In the step S210, the inflection point data Vn of the all pixels read out in the step S209 are memorized in the data memory 154. Then the operation returns to the step S121.

FIG. 14 illustrates the subroutine of the step S141 in FIG. 12. In the step S401, as the same as the step S112, the AF and AE operations are performed. Then focusing of the lens 211 and the photometry operation are conduced. Then the operation moves a step S402. At the step S402, a reflex mirror 141 and a sub mirror 142 are flipped up. Then the operation moves to a step S403. In the step S403, setting the reset voltage $\phi$RSB of the image pickup device 162 to the high voltage, setting the transfer signal $\phi$TX to the middle voltage VM and setting the gate voltage $\phi$RST of the reset gate to a high voltage allow the PD section and the FD section to be reset together (the state illustrated in FIG. 6(a)). Then the operation moves to a step S404.

In the step S404, the aperture 221 is stopped based on the AE result of the step S401. Then the operation moves to a step S405. In the step S405, signal electric charges are accumulated in the PD section when the shutter 145 is opened (the state in FIG. 6(b)). In the step S406, the shutter 145 is closed after the time period corresponding to the shutter speed based on the AE result of the step S401. Then the operation moves to a step S407. In the step S407, the aperture 221 is opened. Then the operation moves to a step S408. In the step S408, the reflex mirror 141 and the sub mirror 142 are flipped down. Then the operation moves to a step S409.

In the step S409, the reset noise NOISE is transferred to the sample & hold circuit 162d. Then the operation moves to a step S410. In the step S410, the signal SIGNAL is transferred to the FD section (the state illustrated in FIG. 6(c)), and then the signal SIGNAL is transferred to the sample & hold circuit 162d. Then the operation moves to a step S411. In the step S411, the CDS (Correlation Double Sampling) operation of the sample & hold circuit 162 cancels the reset noise. Then the operation moves to a step S412. In the step S412, the imaged data, the reset noise of which is canceled, is read out. Then the operation returns to the step S141.

FIG. 15 illustrates an inflection point correction subroutine of the step S161 in FIG. 12. In the step S601, based on the temperature of the image pickup device 162 or the space adjacent to the image pickup device 162, which is detected in the step 151 in FIG. 12, the optimum constant numbers (a, c, and d) are read in from the constant numbers of the standard characteristic, which have been memorized in the data memory 154, or the optimum constant numbers (a, c and d) are calculated by applying an interpolation calculation after reading the pair of plural constant numbers (a, c and d). Then the operation moves to a step S602.

In the step S602, the inflection point data Vn of the all pixels including the inflection point data Vm of the standard characteristic, which are stored in the data memory 154 generated in the inflection point data generation subroutine of the step S121 in FIG. 12 are read in. Then the operation moves to a step S603. In the step S603, Vm' of all the pixels, (which is the lower limit value of the photoelectric conversion output for conducting the inflection point correction based on the offset) is calculated from the inflection point data Vm of the standard characteristic and the inflection point data Vn of all the pixels by applying formula (13). Then the operation moves to a step S604.

In the step S604, the imaged data Vx of all the pixels, which has been obtained in the image pickup subroutine in the step S141 in FIG. 12 is read in. Hereinafter, steps from step S611 to step S641 are repeated for every imaged data of each pixel Vx.

In the step S611, whether the imaged data Vx of a certain pixel is equal to or less than the inflection point Vn of the pixel is determined. When the imaged data Vx of the certain pixel is equal to or less than the inflection point Vn of the pixel (step S611; YES), the operation moves to a step S612. In the step S612, without applying the inflection point correction, the imaged data Vx is memorized in the data memory 154 as the inflection point corrected imaged data Vx'. Then the operation moves to a step S641.

When the imaged data Vx of a certain pixel is more than the inflection point Vn of the pixel (step S611; NO), the operation moves to a step S621. In the step S621, whether the imaged data Vx of the certain pixel is equal to or more than the lower limit value Vm' of the photoelectric conversion output range is checked, the range where the inflection point correction based on the offset calculated in the step S603 is conducted. When the imaged data Vx of the certain pixel is equal to or more than the lowest limit value Vm' (the step S621; YES), the operation moves to a step S622. In the step S622, the offset value Vos illustrated in FIG. 9(b), which is expressed by the formula (10), is calculated, added onto the imaged data Vx of the certain pixel and memorized in the data memory 154. Then the operation moves to the step S641.

When the imaged data Vx of the certain pixel is smaller than the lower limit value Vm', (the Step S621; NO), the operation moves to a step S631. In the step S631, the characteristic conversion from the logarithmic characteristic illustrated in FIG. 9(b), which is given by the formula (16), to the linear characteristic is applied to the imaged data Vx of a certain pixel and stored in the data memory 154 as imaged data Vx' to which the inflection point correction has been applied. Then the operation moves to the step S641.

In the step S641, whether the inflection point correction for all pixels has been finished is checked. When finished (the step S641; YES), the operation returns to the step S161 in the FIG. 12. When not finished (the step S641; NO), the operation return to the step S611 and the next inflection point correction is conducted.

As described above, according to an embodiment of the present invention, prior to the normal image pickup operation for the record, while the image pickup device remains in a light shielded condition, resetting the image pickup device by using at least two different voltages, generating data for expressing the inflection point by using the imaged data obtained after the image pickup device is reset with the two different voltages, and conducting the correction of the inflection point variation by using the data expressing the inflection point allow the inflection point variation correction to be conducted in a substantially real time without large capacity memory, which can memorize the photoelectric conversion of all pixels. Thus it is possible to provide a less expensive image pickup apparatus having high image quality and an inflection point correction method.

In the embodiment described above, with respect to the high voltage VRH given to the reset voltage $\phi$RSB, the high voltage VRH, which is used in the normal reset operation may be used. Thus the voltage newly needed in the present embodiment is only a low voltage VRL.

With respect to the detailed configuration and the detailed operation of the each component configuring the image pickup apparatus of the present invention, various changes and modification may be made without departing from the spirit and scope of the present invention.

What is claimed is:

1. An image pickup apparatus, comprising:
an image pickup device including a plurality of pixels which have a plurality of different photoelectric conversion characteristics different from each other on each side of respective inflection points of the plurality of pixels;
a light shielding member for shading the pixels;
an image pickup control section for controlling an image pickup operation of the image pickup device, the image pickup control section having a reset mode which includes a first reset step in which the image pickup control section resets the pixels of the image pickup device to a first predetermined potential to inject electric charge into the pixels, a second reset step in which the image pickup control section resets the pixels to a second predetermined potential different from the first predetermined potential to partially discharge the injected electric charge with the pixels of the image pickup device shaded by the light shielding member, and an output step in which the image pickup control section outputs imaged data; and
an image processing section for image processing the imaged data outputted from the image pickup device, the image processing section including:
an inflection point data generation section for generating an inflection point data which indicates inflection points of the photoelectric conversion characteristics of the pixels of the image pickup device based on the imaged data outputted in the reset mode; and
an inflection point correction section for executing a correction operation for correcting differences between an inflection point of a standard photoelectric conversion characteristic and the inflection points of the photoelectric conversion characteristics of the pixels of the image pickup device based on the inflection point data.

2. The image pickup apparatus of claim 1, further comprising:
a photoelectric conversion section for converting incident light into electric charges and accumulating the electric charges therein; and an electric charge transfer section, which has a threshold, for transferring the electric charges accumulated in the photoelectric conversion section;
wherein the first predetermined potential is higher than the threshold, and the second predetermined potential is lower than the threshold.

3. The image pickup apparatus of claim 1, wherein the pixels are adapted to be reset to the second predetermined potential in a normal image pickup operation.

4. The image pickup apparatus of claim 1, wherein the image pickup control section is adapted to execute the reset mode before a normal image pickup operation.

5. The image pickup apparatus of claim 1, further comprising:
a temperature detection section for detecting an ambient temperature,
wherein the image processing section is adapted to change a condition of the correction operation of the inflection point correction section based on the detected ambient temperature.

6. The image pickup apparatus of claim 5, wherein the image processing section is adapted to change the standard photoelectric conversion characteristic, of the image pickup device, used for the correction operation based on the detected ambient temperature.

7. An image pickup apparatus, comprising:
an image pickup device including a plurality of pixels which have a plurality of different photoelectric conversion characteristics different from each other on each side of respective inflection points of the plurality of pixels:
an image pickup control section for controlling an image pickup operation of the image pickup device, the image pickup control section having a reset mode which includes a first reset step in which the image pickup control section resets the pixels of the image pickup device to a first predetermined potential to inject electric charge into the pixels, a second reset step in which the image pickup control section resets the pixels to a second predetermined potential different from the first predetermined potential to partially discharge the injected electric charge, and an output step in which the image pickup control section outputs imaged data; and
an inflection point correction section for generating an inflection point data which indicates inflection points of the photoelectric conversion characteristics of the pixels of the image pickup device based on the imaged data outputted in the reset mode and executing a correction operation for correcting differences between an inflection point of a standard photoelectric conversion characteristic and the inflection points of the photoelectric conversion characteristics of the pixels of the image pickup device based on the inflection point data.

8. The image pickup apparatus of claim 7, further comprising:
a photoelectric conversion section for converting incident light into electric charges and accumulating the electric charges therein; and
an electric charge transfer section, which has a threshold, for transferring the electric charges accumulated in the photoelectric conversion section;
wherein the first predetermined potential is higher than the threshold of the electric charge transfer section, and the second predetermined potential is lower than the threshold.

9. The image pickup apparatus of claim 7, wherein the pixels are adapted to be reset to the second predetermined potential in a normal image pickup operation.

10. The image pickup apparatus of claim 7, wherein the image pickup control section is adapted to execute the reset mode before a normal image pickup operation.

11. The image pickup apparatus of claim 7, further comprising:
a temperature detection section for detecting an ambient temperature,
wherein the inflection point correction section is adapted to change a condition of the correction operation of the inflection point correction section based on the detected ambient temperature.

12. The image pickup apparatus of claim 11, wherein the inflection point correction section is adapted to change the standard photoelectric conversion characteristic, of the image pickup device, used for the correction operation based on the detected ambient temperature.

13. A method for image pickup using an image pickup device including a plurality of pixels which have a plurality of different photoelectric conversion characteristics different from each other on each side of respective inflection points of the plurality of pixels, the method comprising the steps of:
executing a reset mode which includes a first reset step in which the pixels of the image pickup device are reset to a first predetermined potential to inject electric charge into the pixels and a second reset step in which the pixels are reset to a second predetermined potential different from the first predetermined potential to partially discharge the injected electric charge with the pixels of the image pickup device shaded, and thereafter outputting imaged data;

generating inflection point data based on the imaged data outputted in the reset mode, the inflection point data indicating the inflection points of the photoelectric conversion characteristics of the pixels of the image pickup device; and correcting an error between an inflection point of a standard photoelectric conversion characteristic and the inflection points of the photoelectric conversion characteristics of the pixels of the image pickup device based on the inflection point data.

14. The method of claim 13, wherein the image pickup device comprises a photoelectric conversion section for converting incident light into electric charges and for accumulating the electric charges therein and an electric charge transfer section, which has a threshold, for transferring the electric charges accumulated in the photoelectric converting section, wherein the first predetermined potential is higher than the threshold and the second predetermined potential is lower than the threshold.

15. The method of claim 13, further comprising the step of:
resetting the pixels to the second predetermined potential in a normal image pickup operation.

16. The method of claim 13, further comprising the step of:
executing a normal image pickup operation,
wherein the reset mode is executed before the normal image pickup operation.

17. The method of claim 13, further comprising the steps of:
detecting an ambient temperature; and
changing a condition of the correcting in the step of the correcting based on the detected ambient temperature.

18. The method of claim 17, wherein a standard photoelectric conversion characteristic of the image pickup device is changed in the step of changing the condition of the correcting.

* * * * *

UNITED STATES PATENT AND TRADEMARK OFFICE
CERTIFICATE OF CORRECTION

| | | |
|---|---|---|
| PATENT NO. | : 7,598,994 B2 | Page 1 of 1 |
| APPLICATION NO. | : 11/524072 | |
| DATED | : October 6, 2009 | |
| INVENTOR(S) | : Koichi Kamon | |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 460 days.

Signed and Sealed this

Twenty-eighth Day of September, 2010

David J. Kappos
*Director of the United States Patent and Trademark Office*